US005703584A

United States Patent [19]

Hill

[11] Patent Number: 5,703,584

[45] Date of Patent: Dec. 30, 1997

[54] ANALOG DATA ACQUISITION SYSTEM

[75] Inventor: John P. Hill, Nederland, Colo.

[73] Assignee: Adaptec, Inc., Milpitas, Calif.

[21] Appl. No.: 293,973

[22] Filed: Aug. 22, 1994

[51] Int. Cl.$^6$ .................................................. H03M 1/12

[52] U.S. Cl. ............................................................ 341/141

[58] Field of Search ...................................... 341/141, 155

[56] References Cited

U.S. PATENT DOCUMENTS

| | | | |
|---|---|---|---|
| 4,016,557 | 4/1977 | Zitelli et al. | 341/139 |
| 4,033,186 | 7/1977 | Bresie | 73/154 |
| 4,424,543 | 1/1984 | Lewis et al. | |
| 4,498,129 | 2/1985 | Velazquez | 364/174 |
| 4,530,019 | 7/1985 | Penniman | |
| 4,669,004 | 5/1987 | Moon et al. | |
| 4,823,212 | 4/1989 | Knowles et al. | |

*Primary Examiner*—Brian K. Young
*Attorney, Agent, or Firm*—Skjerven, Morrill, MacPherson, Franklin & Friel; Forrest E. Gunnison

[57] ABSTRACT

An analog data acquisition system in an integrated circuit automatically processes and stores analog data without sequencing support from a processor. The analog data acquisition system converts each analog input signal into digital data. The digital data are stored in registers in the integrated circuit that are directly readable by a digital signal processor without data moves and are directly usable by the digital signal processor without further processing or conversion. Consequently, the analog data acquisition system minimizes the use of both the digital signal processor and the digital signal processor program memory and leaves capacity, i.e., both processing time and instruction memory locations, for use in other activities. The analog data acquisition system includes an analog input multiplexer and an analog-to-digital (A/D) converter that has an input line that is connected to the analog input multiplexer output line. An acquisition sequencer provides signals to the analog input multiplexer so that a signal on one of the plurality of input lines to the analog input multiplexer is applied to the A/D converter.

39 Claims, 11 Drawing Sheets

ANALOG DATA ACQUISITION SYSTEM

BACKGROUND OF THE INVENTION

1. Field of the Invention

The present invention relates generally to processing servo burst data in a disk drive embedded servo system and more specifically to an analog data acquisition system for processing servo position burst data in a disk drive embedded servo system without processor control for sequencing the processing, and for processing analog data from other sources within a disk drive.

2. Description of Related Art

Typically, a disk drive contains one or more circular planar disks. Data are recorded by a read/write head of the disk drive in concentric circular tracks on a disk. Corresponding tracks on different disk surfaces are cylindrically aligned.

The configuration of the data on the magnetic surface is instrumental in the operation of the disk drive. Typically, each track is segmented into one or more parts that are referred to as sectors. Thus, the disk drive moves the read/write head radially across a disk's surface to locate a track for reading or writing data and then follows that track circumferentially until the desired sector passes under the read/write head.

Many different embedded servo systems have been developed to position a read/write head in hard disk drives. In an embedded servo system, the read/write head reads a servo pattern contained in a servo field to determine the radial and circumferential position of the read/write head relative to the disk. The information that is read is provided to the disk drive control loop electronics which in turn repositions the read/write head as necessary based on that information.

Typically, for radial positioning, two sub-fields, i.e., a cylinder address sub-field and a position sub-field, within the servo field have been used. The cylinder address sub-field contains a Gray code pattern that (i) identifies the track containing the servo field and (ii) is a coarse radial position indicator.

The position sub-field is usually a magnetic pattern that generates a series of servo position bursts. The disk drive electronics detects the peak of each of the series of servo position bursts in the position sub-field. When the read/write head is radially centered over the track, the peak amplitude of the servo position bursts adjacent to and on both sides of the center of the track are equal. The difference between the peak amplitude of adjacent pulses corresponds directly to the amount the read/write head is off track center.

Several different approaches have been used in the track position sub-field of the servo field to encode information that results in accurate track following. For examples of track positioning techniques, see U.S. Pat. No. 4,823,212 issued to Knowles et al. on Apr. 18, 1989; U.S. Pat. No. 4,530,019 issued to Penniman on Jul. 16, 1985; U.S. Pat. No. 4,424,543 issued to Lewis et al. on Jan. 3, 1984; and U.S. Pat. No. 4,669,004 issued to Moon et al. on May 26, 1987, which are incorporated herein by reference in their entirety.

Moon et al. in U.S. Pat. No. 4,669,004 show a circuit that sequentially processes each servo position burst amplitude and provides the result to an analog-to-digital converter. The analog-to-digital converter sends a digital word to a microprocessor where the word is stored in temporary local storage. The sequential processing and the use of the microprocessor for temporarily storing the digital word limits the speed with which the servo position burst data can be processed. Further, the use of the microprocessor requires memory space to store the instructions used by the microprocessor in the process.

As disk drive capacity increases and the disk drives become smaller, the demands on the microprocessor and storage space for the microprocessor increase. A more efficient technique is needed for acquiring and processing the servo position burst data to further enhance disk drive embedded servo performance.

SUMMARY OF THE INVENTION

In accordance with the principles of this invention, a novel analog data acquisition system in an integrated circuit automatically processes and stores analog data without sequencing support from a processor. The analog data acquisition system converts each analog input signal into digital data. The digital data are stored in registers in the integrated circuit that are directly readable by a digital signal processor without data moves and are directly usable by the digital signal processor without further processing or conversion. Consequently, the analog data acquisition system minimizes the use of both the digital signal processor and the digital signal processor program memory and leaves capacity, i.e., both processing time and instruction memory locations, for use in other activities.

For example, if the integrated circuit containing the analog data acquisition system of this invention is used in a disk drive, the analog data acquisition system can capture analog data from sources such as a read channel integrated circuit that can be utilized in testing and calibration of the disk drive, or in operation of the disk drive. Also, analog signals from an amplifier that powers a tracking system voice coil actuator can be captured to obtain information proportional to the actuator acceleration (motor current) and velocity (back electromagnetic force (EMF) voltage). Analog data from a shock sensor circuit and/or a temperature sensor circuit can also be processed by the analog data acquisition system. For testing and calibration, the output signals of the voice coil motor digital-to-analog converter and of the spin motor digital-to-analog converter as well as reference voltages can be processed by the analog data acquisition system. Consequently, the analog data acquisition system not only provides a new level in disk drive performance but also adds new functionality within the disk drive both for testing and calibration, and for analyzing signals used by either the disk drive microprocessor or a servo burst decoder.

In one embodiment, the analog data acquisition system includes an analog input multiplexer having a plurality of input lines, an output line and a plurality of signal select lines. An analog-to-digital (A/D) converter has an input line that is connected to the analog input multiplexer output line, a plurality of control lines, and a digital output bus. An acquisition sequencer is coupled to the plurality of signal select lines and to the plurality of control lines. The acquisition sequencer provides signals over the plurality of signal select lines so that a signal on one of the plurality of input lines to the analog input multiplexer is applied to the A/D converter. In response to signals from the acquisition sequencer on the control lines, the A/D converter transforms the signal from the analog input multiplexer to a digital signal.

The digital signal is stored in a memory connected to the digital output bus of the A/D converter. A portion of the memory is within a memory space of a processor so that data in the memory can be read directly by the processor without a data move. In one embodiment, the memory includes a plurality of registers.

A counter circuit in the acquisition sequencer is coupled to the plurality of registers. In a pipeline mode of operation, the counter circuit generates a signal to select one of the plurality of registers into which the digital data on the digital output bus of the A/D converter are loaded.

The data acquisition system also includes a register, having a plurality of bits, connected to the acquisition sequencer. In a single channel mode of operation of the analog data acquisition system, the plurality of bits select one of the plurality of registers into which the digital data on the digital output bus of the A/D converter are loaded.

The acquisition sequencer includes a state machine connected to the plurality of control lines of the A/D converter. The state machine generates signals over the plurality of control lines so that each signal applied to the A/D converter is converted to a digital signal.

The analog data acquisition system includes another counter circuit that is coupled to the plurality of signal select lines of the analog input multiplexer and to a conversion in progress signal line of the state machine. In response to an active signal on the conversion in progress signal line, the another counter circuit generates signals on the plurality of signal select lines so that a selected one of signals on the analog input multiplexer input lines are passed through the analog input multiplexer to the analog input multiplexer output line. The state machine generates an active signal on an increment in counter line that is connected to the another counter circuit to change the value of that counter circuit.

The novel analog data acquisition system of this invention provides an automated system for processing analog data and storing the resulting digital data in a memory that can be directly read by a processor. The analog data acquisition system can be used for testing and for operational signals.

DETAILED DESCRIPTION

Figure 1:
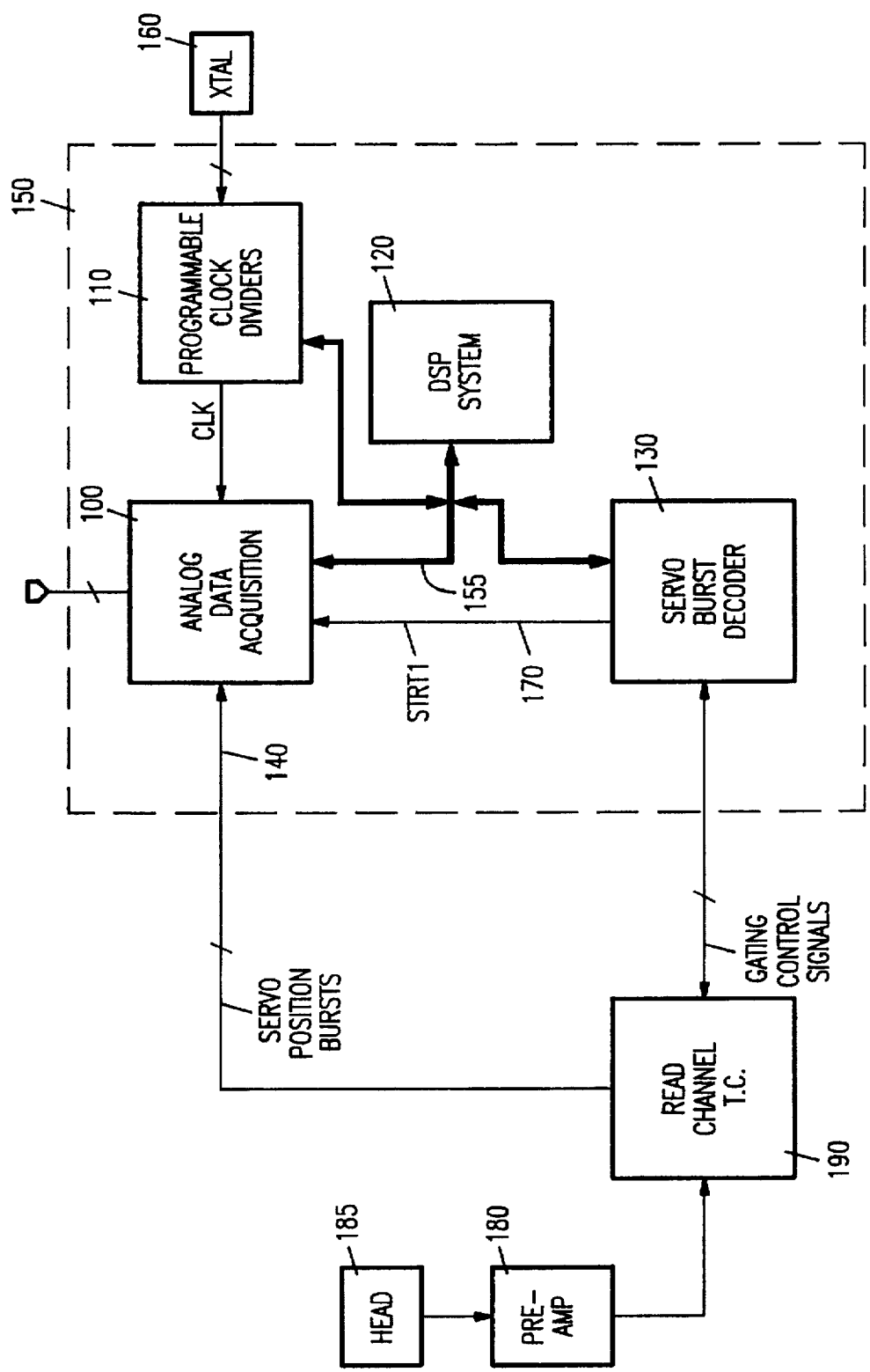
FIG. 1 is a block diagram of an integrated circuit containing the analog data acquisition sequencer of this invention.

In accordance with the principles of this invention, a novel analog data acquisition system 100 (FIG. 1) automatically processes and stores servo position bursts without sequencing support from a processor 120. Analog data acquisition system 100 converts each analog servo position burst into digital data. The digital data are stored in registers that are directly readable by digital signal processor 120 without data moves and are directly usable by digital signal processor 120 without further processing or conversion. Analog data acquisition system 100 minimizes the use of digital signal processor 120 and digital signal processor program memory and consequently leaves capacity, i.e., both processing time and instruction memory locations, for use in processing of other servo field information as well as capacity for performing control function analyses for the tracking system, and for performing spin system and data path control functions of the disk drive.

In addition, analog data acquisition system 100 captures analog data from other sources in a disk drive that can be utilized in testing and calibration of the disk drive, or in monitoring the operation of the disk drive. For example, analog signals from an amplifier that powers a tracking system voice coil actuator can be captured to obtain information proportional to the actuator acceleration (motor current) and velocity (back electromagnetic force (EMF) voltage). Analog data from a shock sensor circuit and/or a temperature sensor circuit can also be processed by analog data acquisition system 100. For testing and calibration, the output signals of the voice coil motor digital to analog converter and of the spin motor digital to analog converter as well as reference voltages can be processed by analog data acquisition system 100. Consequently, analog data acquisition system 100 not only provides a new level in disk drive performance but also adds new functionality within the disk drive both for testing and calibration and for analyzing signals used by either the disk drive microprocessor or the servo burst decoder.

In one embodiment, analog data acquisition system 100 of this invention is included in an integrated circuit 150 that includes in addition to analog data acquisition system 100: a programmable clock divider circuit 110 that is driven by an external crystal 160; a digital signal processor (DSP) system 120 that includes a DSP core, random access memory (RAM), read-only memory (ROM), timers, and an interrupt controller; and a programmable servo burst decoder 130. DSP system 120 is sometimes referred to as DSP 120.

The particular configuration of the elements included within integrated circuit 150 are not critical to this invention so long as the elements provide the signals to analog data acquisition system 100, that are described more completely below. One embodiment of a programmable servo burst decoder 130 suitable for use in this invention is described in copending, commonly filed, and commonly assigned, U.S. patent application Ser. No. 08/293,981, entitled "Programmable Servo Burst Decoder" of Nicolas C. Assouad et al. filed on Aug. 22, 1994, which is incorporated herein by reference in its entirety.

In this embodiment, disk drive head 185 reads the embedded servo data on the disk and provides an analog signal representing the servo data to preamp 180. Preamp 180 provides an amplified analog signal to a read channel integrated circuit 190. One read channel integrated circuit 190 suitable for use with this invention is sold by IMP, 2830 North First Street, San Jose, Calif. 95134 as integrated circuit part number IMP62C538-40. Another read channel integrated circuit 190 suitable for use with this invention is sold by VTC Inc., 2800 East Old Shakopee Road, Bloomington, Minn., 55425-1350 as integrated circuit part number VM7401. In response to gating signals from programmable servo burst decoder 130, read channel integrated circuit 190 captures and holds the peak amplitude of each servo position burst. Typically, four analog servo position bursts are provided on lines 140 to analog data acquisition system 100 by read channel integrated circuit 190.

Typically, at reset, DSP 120 reads its program memory for instructions and then loads all the configuration registers within integrated circuit 150 including a configuration register within analog data acquisition system 100 as well as a sequencer instruction memory for a timing mark sequencer and an instruction for a servo burst sequencer that are both within servo burst decoder 130 as per the instructions in the program memory code. A more detailed description of servo burst decoder 130 including timing mark sequencer and servo burst sequencer is given in copending, commonly filed, and commonly assigned, U.S. patent application Ser. No. 08/293,981, entitled "Programmable Servo Burst Decoder," of Nicolas C. Assouad et al., that was cited above.

In disk drive operation, the servo burst sequencer remains in an idle loop until the timing mark sequencer detects a servo timing mark and in response generates a servo timing mark signal. In response to the servo timing mark signal, the servo burst sequencer sends gating and control signals to read channel integrated circuit 190 to capture the amplitude values of the position bursts within the servo burst. The burst sequencer within servo burst decoder 130 can be programmed to generate a start signal on line 170 to analog data acquisition system 100 at any time. However, for processing of the servo position bursts, the start signal is generated after read channel integrated circuit 190 captures most or all of the position bursts. The particular time for generation of the start signal is not a critical part of this invention and is determined by the disk drive manufacturer to achieve the desired performance.

In this embodiment, analog data acquisition system 100 initiates processing the analog servo position bursts in response to analog acquisition start pulse STRT1 on line 170 from servo burst decoder 130. Analog data acquisition system 100 processes the servo position bursts in a pipe-lined mode of operation. Specifically, as the analog servo position burst data for a first channel is being converted to digital data, processing on the analog servo position burst data for a second channel is started and so on. The timing of the operations within analog data acquisition system 100 is determined by a programmable clock signal CLK from programmable clock divider circuit 110.

When the processing for a particular channel is completed, analog data acquisition system 100 stores the digital data, which are directly usable by DSP 120 without further processing, in memory within analog data acquisition system 100 without assistance by DSP 120. The memory within analog data acquisition system 100 is on a bus 155 that is connected to the arithmetic units of DSP 120 so that the stored digital data are directly readable by DSP 120 without a data move. Specifically, in one embodiment, the registers are a part of DSP 120 and are referred to as general purpose registers. DSP instructions can operate on these general purpose registers without requiring the prior art data move instruction. This saves processing time which in turn improves servo performance.

Analog data acquisition system 100 also processes within each servo field processing period another multiplicity of analog data signals in the same pipe-lined operations that process the analog servo position bursts. Thus, analog data acquisition system 100 not only provides conversion of servo position burst data but also other analog data that may be needed by DSP 120.

While the pipe-lined mode of operation is typically used to process analog servo position burst data, data acquisition system 100 can also be configured to process only one of the analog input data streams. This capability is useful for processing analog data between bursts of servo data.

Figure 2:
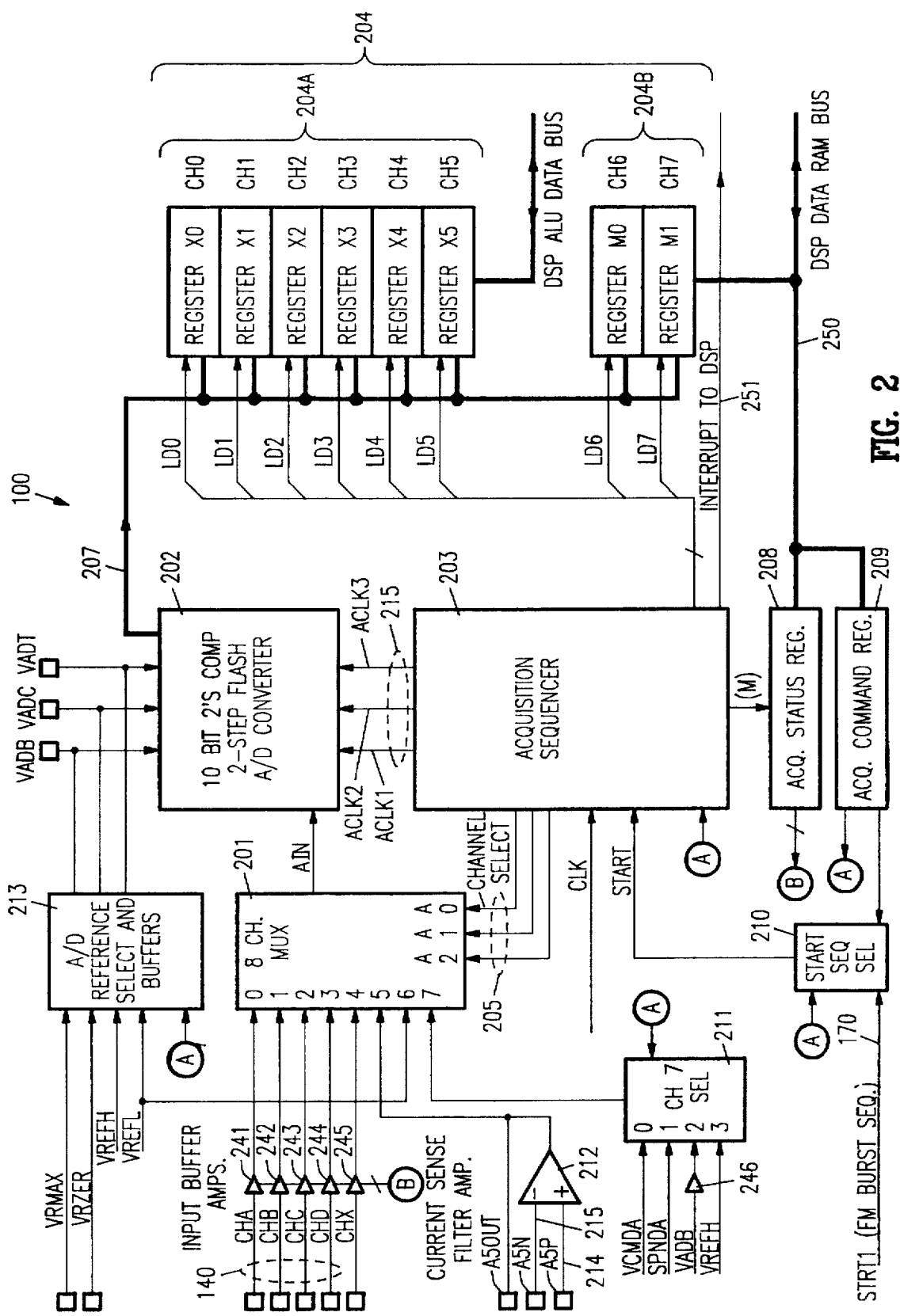
FIG. 2 is a block diagram of the analog data acquisition sequencer of this invention.

Analog data acquisition system 100 includes an analog multiplexer 201 (FIG. 2) that receives a plurality of input signals that include both servo position burst signals on lines 140, and operational signals, e.g., a motor current, a back EMF voltage, a shock signal, or a temperature signal, and test signals. The signal passed through analog multiplexer 201 to analog-to-digital (A/D) converter 202 is determined by a plurality of channel select signals 205 that are provided to analog multiplexer 201 by acquisition sequencer 203.

In response to control signals from acquisition sequencer 203, A/D converter 202 uses a two step process to convert each analog signal from analog multiplexer 201 to a digitized twos complement signal. The digital signal from A/D converter 202 is passed over a digital data bus 207 to a memory, which in this embodiment is a plurality of registers 204. A particular register within the plurality of registers 204 is loaded with the digital signal by acquisition sequencer 203. Hence, acquisition sequencer 203 selects the analog input signal to A/D converter 202, sequences A/D converter 202, and stores the digital data in one of registers 204.

A first subset 204A of the plurality of registers 204 are general purpose registers within the DSP core address space of digital signal processor 120. Consequently, first subset of registers 204A can be read directly by digital signal processor 120 without a data move. A second subset 204B of the plurality of registers 204 are memory mapped I/O registers.

In this embodiment, analog multiplexer 201 has eight input terminals. Input terminals 0 to 3 receive channel A to channel D servo position burst signals, respectively over lines 140 from input pins CHA to CHD, respectively of integrated circuit 150. As explained above, channel A to channel D servo position burst signals are typically provided by demodulator circuitry in external read channel integrated circuit 190. However, the particular signals on input terminals 0 to 3 is not limited to just four servo position burst signals. The input signals can be combinations of servo position burst signals A, B, C, and D such as A–B, C–D, A+B. Analog data acquisition system 100 can process any configuration of servo position burst signals that is provided by read channel integrated circuit 190.

Input terminal 4 of analog multiplexer 201 receives a channel X signal from integrated circuit input pin CHX. The channel X signal is typically a normalization or reference signal that is provided by the demodulator circuitry in external read channel integrated circuit 190. Alternatively, the channel X signal can be a test signal for measuring tracking loop performance, a shock signal, a temperature signal, or any other analog signal of interest.

Hence, five input channels to analog data acquisition system 100 are available to external signal sources. Each of input channels A to D and X has a high impedance buffer amplifier 241 to 245, respectively, that is positioned between the input pin and the input terminal of analog multiplexer 201. An input channel signal for channels A to D and X can either be amplified by high impedance buffer amplifiers 241 to 245, respectively, or be passed directly to the corresponding input terminal of analog multiplexer 201 without amplification. As explained more completely below, the operation of each of configurable buffer amplifiers 241 to 245 is controlled by a bit in acquisition status register 208.

Input terminal 5 of analog multiplexer 101 is connected to an output terminal of operational amplifier 212. The output terminal of operational amplifier 212 is also connected to an integrated circuit output pin A5OUT. Positive input line 214 and negative input line 215 to operational amplifier 212 are connected to integrated circuit input pins A5P and A5N, respectively. In one embodiment, operational amplifier 212 is used to scale and filter voice coil motor (VCM) current sense information.

Input terminal 6 of analog multiplexer 201 is connected to a reference voltage VREFL, that is the zero reference voltage, i.e., the center of swing for all analog signals within integrated circuit 150.

Input terminal 7 of analog multiplexer 201 is connected to the output terminal of channel seven select multiplexer 211, which has four input lines. One of the four input lines to multiplexer 211 includes a buffer amplifier 246. Buffer amplifier 246 is identical to buffer amplifiers 241 to 245. The offset voltage for buffer amplifier 246 can be read directly and subtracted from the data on channels A to D and X when buffer amplifiers 241 to 245 are enabled and an absolute reading is needed. The control signals for multiplexer 211 are provided by acquisition command register 209, which is described more completely below.

The output terminal of analog multiplexer 201 is connected to an input line AIN of A/D converter 202. In this embodiment, A/D converter 202 is a 10-bit, two-step flash A/D converter. Input reference voltages to A/D converter 202 are provided by A/D reference select and buffers circuit 213. A more detailed diagram of A/D reference and select buffers circuit 213 is presented in FIG. 3.

In this embodiment, A/D reference select and buffers circuit 213 provides three reference voltages to A/D converter 202. Each reference voltage is also supplied to an integrated circuit output pin. A first reference voltage VADT sets the peak voltage swing of A/D converter 202. A second reference voltage VADC sets the center of the voltage swing for A/D converter 202. A third reference voltage VADB is the bottom voltage for A/D converter 202. Voltage VADB is generated by circuit 213 and is defined as:

$$VDAB=(2*VADC)-VADT$$

where voltages VADT and VADC are the first and second reference voltages respectively.

A/D reference select and buffers circuit 213 receives a plurality of input reference voltages and a plurality of control signals from acquisition command register 209. A pair of input reference voltages VRMAX and VRZER are provided by integrated circuit input pins and a pair of buffered reference voltages VREFH and VREFL are generated within integrated circuit 150.

Either external reference voltage VRMAX or internal reference voltage VREFH sets the peak voltage swing of A/D converter 202, and either external reference voltage VRZER, or internal reference voltage VREFL sets the center of the voltage swing for A/D converter 202. The pair of external voltage reference signals VRMAX and VRZER permit the user of analog data acquisition system 100 to relate the voltage reference signals for A/D converter 202 to signals generated by read channel integrated circuit 190.

Figure 3:
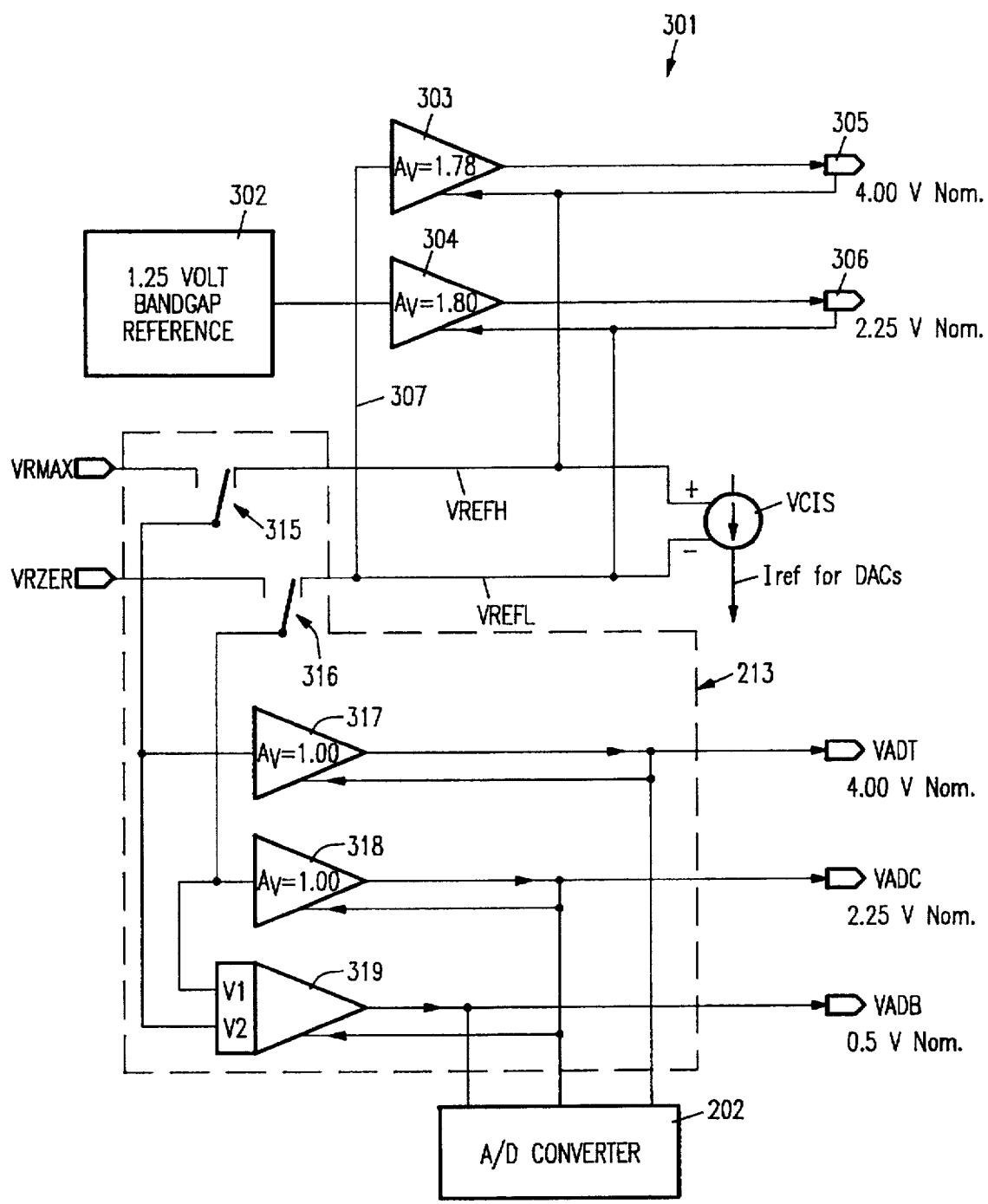
FIG. 3 is a more detailed diagram of the A/D reference select and buffers circuit of FIG. 2 and an internal reference voltage generation circuit.

With the configuration shown in FIG. 3 and using the internal reference voltages VREFH and VREFL, the signal swing is from 0.5 volts to 4.0 volts with the twos complement zero at 2.25 volts in a five volt mode. In a three volt mode and using the internal reference voltages VREFH and VREFL, the signal swing is from 0.5 volts to 2.5 volts with the twos complement zero at 1.5 volts. Using the external reference voltages VRMAX and VRZER, the twos complement zero, the center voltage, can range from about 1.25 volts to about 2.75 volts. The voltage swing should be at least ±0.5 volts around the center voltage and no more than 0.5 volts from the supply rail voltages as a maximum.

The input signals passed through A/D reference select and buffers circuit 213 and the mode of operation are determined by the plurality of control signals from acquisition command register 209. As explained more completely below, acquisition command register 209 has two bits that are used to select among the four input voltages.

As explained more completely below, A/D converter 202 is a two step flash A/D converter that has coarse comparators that are coupled to output line AIN of analog multiplexer 201, and connected to a first voltage reference ladder, and fine comparators that are coupled to output line AIN of analog multiplexer 201 and a connected to second voltage reference ladder. As is known to those skilled in the art, a voltage reference ladder is a long resistor with many taps that function as many voltage dividers. Specifically, each tap provides a reference voltage to a comparator in a bank of comparators. Each comparator in the bank determines if the analog input voltage is smaller or greater than its particular threshold voltage from the voltage reference ladder. In this embodiment, the bank of fine comparators and the bank of coarse comparators are implemented using a charge balance comparator circuit configuration, as explained more completely below. Also, the voltage reference ladders may be bypassed to minimize noise pick up from other disk drive components if needed. The particular configuration of A/D converter 202 is not an essential feature of the invention. The important aspect is to select a configuration that provides the necessary resolution and can generate the twos complement output in a time period that does not limit the operation of data acquisition system 100.

A/D converter 202 generates 16-bit digital data in a two's complement fixed point format on digital data bus 207 to registers 204. The ten most significant bits of the digital data are the actual output of A/D converter 202, i.e., the data is left-justified, and the six least significant bits are set to zero.

In another embodiment, alignment of the A/D converter output signal with the 16 bit DSP system word could be changed. For example, the four most significant bits of the DSP system word, i.e., bits 15 to 12, would be the same as the most significant bit of the A/D converter output signal, e.g., a sign extension. The next ten bits of the DSP system word, i.e., bits 11 to 2, are the next ten bits of the A/D converter output signal and the two least significant bits of the DSP word are set to zero. This alignment would allow calculations to be performed on data from the A/D converter without shifting the data first. This may be desirable in some types of signal processing analyses that compare and combine the servo position bursts, for example.

Acquisition sequencer 203, as explained more completely below, coordinates the operation of analog multiplexer 201, A/D converter 202 and loads registers 204. Acquisition sequencer 203 receives a clock signal CLK, control commands from acquisition command register 209, and a start pulse from start sequencer select circuit 210. As explained more completely below, a state machine in acquisition sequencer 203 generates sample enable signal ACLK1, coarse comparison enable signal ACLK2, and fine comparison enable signal ACLK3 to A/D converter 202, i.e. control signals 215 to A/D converter 202, and a load signal to the appropriate register in registers 204. When sample enable signal ACLK1 is active, sampling occurs in A/D converter 202. When coarse compare enable signal ACLK2 is active, the coarse comparison is performed by A/D converter 202 and when fine comparison enable signal ACLK3 is active, the fine comparison is performed by A/D converter 202.

The active period of signals on output lines ACLK2 and ACLK3 and the period of signal ACLK1 are determined by input signals to acquisition sequencer 203 from a 16-bit clock configuration register CLCFG2. The five least significant bits, i.e., bits 0 to 4, of clock configuration register CLCFG2 are divisor ACLK1 bits. Sample enable signal ACLK1 is generated by acquisition sequencer 203 by dividing clock CLK by one plus the value of the five bits and multiplying the result of the division by two.

Bits 5 to 7 of clock configuration register CLCFG2 are ACLK2 and ACLK3 pulse width bits. The pulse width of the active state of signals ACLK2 and ACLK3 is generated by acquisition sequencer 203 holding signals ACLK2 and ACLK3 active for the value of the three bits plus one clock cycle of clock CLK.

Also, acquisition sequencer 203 can generate a hardware interrupt to DSP 120 after any of the input channels has been analyzed and the digital data stored in the corresponding register. Finally, acquisition sequencer 203 sets and clears bits in acquisition status register 208 for DSP 120 to indicate whether a particular channel has been converted and stored.

Prior to considering the operation and structure of analog data acquisition system 100 further, one embodiment of acquisition status register 208 and acquisition command register 209 are defined.

Table 1 is one embodiment of acquisition command register 209. Register 209 is a sixteen-bit register that is configured by DSP 120 and consequently is on DSP data RAM bus 250.

TABLE 1

| ACQUISITION COMMAND REGISTER STRUCTURE | | | |
|---|---|---|---|
| Bit(s) | Read/Write | Reset | Name |
| 15 | rw | 0 | Max. Reference Voltage Select |
| 14 | rw | 0 | Zero Reference Voltage Select |
| 13:12 | rw | 00 | Channel 7 Select |
| 11:09 | rw | 000 | DSP Interrupt |
| 08 | rw | 0 | Burst Sequencer Start Pulse Enable |
| 07 | rw | 0 | Single Channel Mode Interrupt Enable |
| 06 | rw | 0 | Reserved |
| 05 | rw | 0 | Acquisition Sequencer Enable |
| 04:02 | rw | 0 | Single Channel Mode Channel Address |
| 01 | rw | 0 | Pipeline Mode Start |
| 00 | rw | 0 | Single Channel Mode Start |

Bit 15, maximum reference voltage select bit, is set by DSP 120 to select external maximum positive reference input voltage VRMAX from A/D reference select and buffers circuit 213, as discussed more completely below. Otherwise, when maximum reference voltage select bit is not set, the internal maximum positive reference input voltage VREFH is selected by A/D reference select and buffers circuit 213.

Bit 14, zero reference voltage select bit, is set by DSP 120 to select the external zero reference input voltage VRZER for use by A/D reference select and buffers circuit 213. Otherwise, when zero reference voltage select bit is not set, the internal zero reference input voltage VREFL is selected by A/D reference select and buffers circuit 213.

Bits 13 and 12 of acquisition command register 209 are the channel 7 select bits and are used to select the input voltage passed through channel 7 input multiplexer 211 to terminal 7 of analog multiplexer 201. Table 2 is one embodiment of the input voltage signal selection of channel 7 input multiplexer 211.

TABLE 2

| Bit 13 | Bit 12 | Input Voltage Passed Through Mux 211 |
|---|---|---|
| 0 | 0 | VCM D/A voltage output signal |
| 0 | 1 | Spindle D/A voltage output signal |
| 1 | 0 | Voltage VADB + Buffer Shift Voltage |
| 1 | 1 | Maximum internal reference voltage VREFH |

Bits 11 though 9 of acquisition command register 209 are the DSP interrupt bits. These bits define a channel number N binary address. After data is stored in register for channel number N, acquisition sequencer 203 generates an interrupt on DSP interrupt line 251. Bit 11 defines the most significant bit in binary channel address N. In one embodiment, the interrupt generated based on bits 11 through 9 is masked by a DSP system interrupt controller so that the interrupt is generated only when it is desired.

Bit 8 of acquisition command register 209 is set by DSP 120 so that a start pulse on line 170 is passed through start sequencer select circuit 210 to acquisition sequencer 203. Acquisition sequencer 203 initiates a pipeline conversion sequence in response to the start pulse if the acquisition sequencer enable bit is set.

Bit 7 of acquisition command register 209 is set by DSP 120 to enable acquisition sequencer 203 to send an interrupt to DSP 120 upon storing converted data for a single channel in one of registers X0 to X5 in register subset 204 as defined by the information in bits 2 to 4.

Bit 5 of acquisition command register 209, the acquisition sequencer enable bit, is set by DSP 120 to enable acquisition sequencer 203 to run. If the acquisition sequencer enable bit is reset while acquisition sequencer 203 is running, acquisition sequencer 203 is stopped and returns to the reset state. The acquisition sequencer enable bit overrides burst sequencer start pulse enable bit and so the acquisition sequencer enable bit must also be set before acquisition sequencer 203 can start.

Bits 4 through 2 of acquisition command register 209 define the single channel mode channel address. These bits select the input channel for a single channel conversion. Bit 4 is the most significant bit of the channel address.

Bit 1 of acquisition command register 209 is set by DSP 120 to start conversion of the analog signals on the eight input channels to analog multiplexer 201 by acquisition sequencer 203 in the pipeline mode. When acquisition sequencer 203 starts the conversion, acquisition sequencer 203 resets this pipeline mode start bit.

Bit 0 of acquisition command register 209 is the single channel mode start bit. DSP 120 sets bits 7 and bits 4 through 2, if they are required, prior to setting this bit or at the same instruction time, because when this bit is set, acquisition sequencer 203 starts a single channel mode conversion. When acquisition sequencer 203 starts the single channel mode conversion, acquisition sequencer 203 resets this single channel mode start bit. If both bits 1 and 0 of acquisition command register 209 are set, the pipeline mode of operation overrides the single channel mode of operation. Thus, the single channel mode of operation is preferably started only when there is sufficient time to complete the single channel mode of operation before the next pipelined mode of operation.

Table 3 is one embodiment of acquisition status register 208, which in this embodiment is a sixteen-bit register that has some bits that are configured by DSP 120 and some bits that are configured by acquisition sequencer 203 and read by DSP 120. Consequently, acquisition status register 208 is also on DSP data RAM bus 250.

TABLE 3

ACQUISITION STATUS REGISTER STRUCTURE

| Bit(s) | Read/Write | Reset | Name |
| --- | --- | --- | --- |
| 15 | rw | 0 | Reserved |
| 14 | r | 0 | ADC Borrow Bit for testing only |
| 13 | r | 0 | ADC Carry Bit for testing only |
| 12 | rw | 0 | Channel X (Channel 4) Buffer Enable |
| 11 | rw | 0 | Channel D (Channel 3) Buffer Enable |
| 10 | rw | 0 | Channel C (Channel 2) Buffer Enable |
| 09 | rw | 0 | Channel B (Channel 1) Buffer Enable |
| 08 | rw | 0 | Channel A (Channel 0) Buffer Enable |
| 07 | r | 0 | Channel 7 Busy |
| 06 | r | 0 | Channel 6 Busy |
| 05 | r | 0 | Channel 5 Busy |
| 04 | r | 0 | Channel 4 Busy |
| 03 | r | 0 | Channel 3 Busy |
| 02 | r | 0 | Channel 2 Busy |
| 01 | r | 0 | Channel 1 Busy |
| 00 | r | 0 | Channel 0 Busy |

In Table 3 and herein, channel 0 and channel A are the same channel as are the other channels with two channel designations for a bit in Table 3. Also, registers X0 through X5 in registers 204A are the registers for channels 0 through 5 respectively and registers X6 and X7 in registers 204B are the registers for channels 6 and 7 respectively. The channel input signal is the input signal on the input terminal of analog multiplexer 201 with the same number. Also, herein elements, signals, or other features of the invention with the same reference numeral are the same.

Channel buffer enable bits 08 through 12 in acquisition status register 208 are set by DSP 120 to enable buffers 241 to 245, respectively. If a channel buffer enable bit is not set, the signal on the input line is passed directly to analog multiplexer 201 without buffering.

Channel busy bits 07 to 00 are set by acquisition sequencer 203 upon the initiation of a pipelined mode conversion cycle and are reset as digital data is loaded in the corresponding channel register X0 to X7.

Initially DSP 120 sets bits in acquisition command register 209 and acquisition status register 208 to select the various features as described above.

FIG. 3 is a more detailed diagram of A/D reference select and buffers circuit 213 and an internal reference voltage generator 301. For a 5 volt mode of operation, reference voltage supply circuit 302 in internal reference voltage generator 301 provides a 1.25 volt bandgap reference voltage to an input terminal of amplifier 304. Amplifier 304 has a voltage gain of 1.80 and so generates a nominal 2.25 volts that is applied to line VREFL, that is applied to pin 306, and that is feedback to amplifier 304.

The voltage on line VREFL is connected to line 307, to the minus terminal of current source VCIS, and to a pole of switch 316. Line 307 connects voltage VREFL to an input terminal of amplifier 303 that has a voltage gain of 1.78 and so generates a nominal 4.00 volts that is applied to line VREFH and pin 305, and is feedback to amplifier 303. The voltage on line VREFH is connected to the plus terminal of current source VCIS, and a pole of switch 315. Current source VCIS provides a reference current Iref for the digital-to-analog converters in integrated circuit 150.

Another pole of switch 315 is connected to pin VRMAX and another pole of switch 316 is connected to pin VRZER. The selector of switch 315 is connected to an input terminal of amplifier 317 and to terminal V2 of amplifier 319. The selector of switch 316 is connected to an input terminal of amplifier 318 and to terminal V1 of amplifier 319. Switch 315 and switch 316 are used in FIG. 4 to illustrate the operation a logic circuit switch that is set by the state of bits 14 and 15 in acquisition command register 209. The implementation of the switch function using the two bits is known to those skilled in the art.

Amplifiers 317 and 318 are in A/D reference select and buffers circuit 213. Amplifier 317 has a voltage gain of one and generates the voltage on line VADT to A/D converter 202. Amplifier 318 also has a voltage gain of one and generates the voltage on line VADC to A/D converter 202. Amplifier 319 generates voltage VADB, that was described above, to A/D converter 202. Thus, setting the two most significant bits in acquisition command register 209 configures A/D reference select and buffers circuit 213 so that the appropriate reference voltages are applied to A/D converter 202.

In one embodiment, a register includes a bit for specifying either 5 volt or 3 volt operations. When this bit is set, reference voltages VREFL and VREFH change from 2.25 V and 4.00 V to 1.50 V and 2.50 V, respectively. This voltage range allows voltage swings in the A/D converter that are suitable for use with lower supply voltages such as 3.3 volts.

Figure 4A:
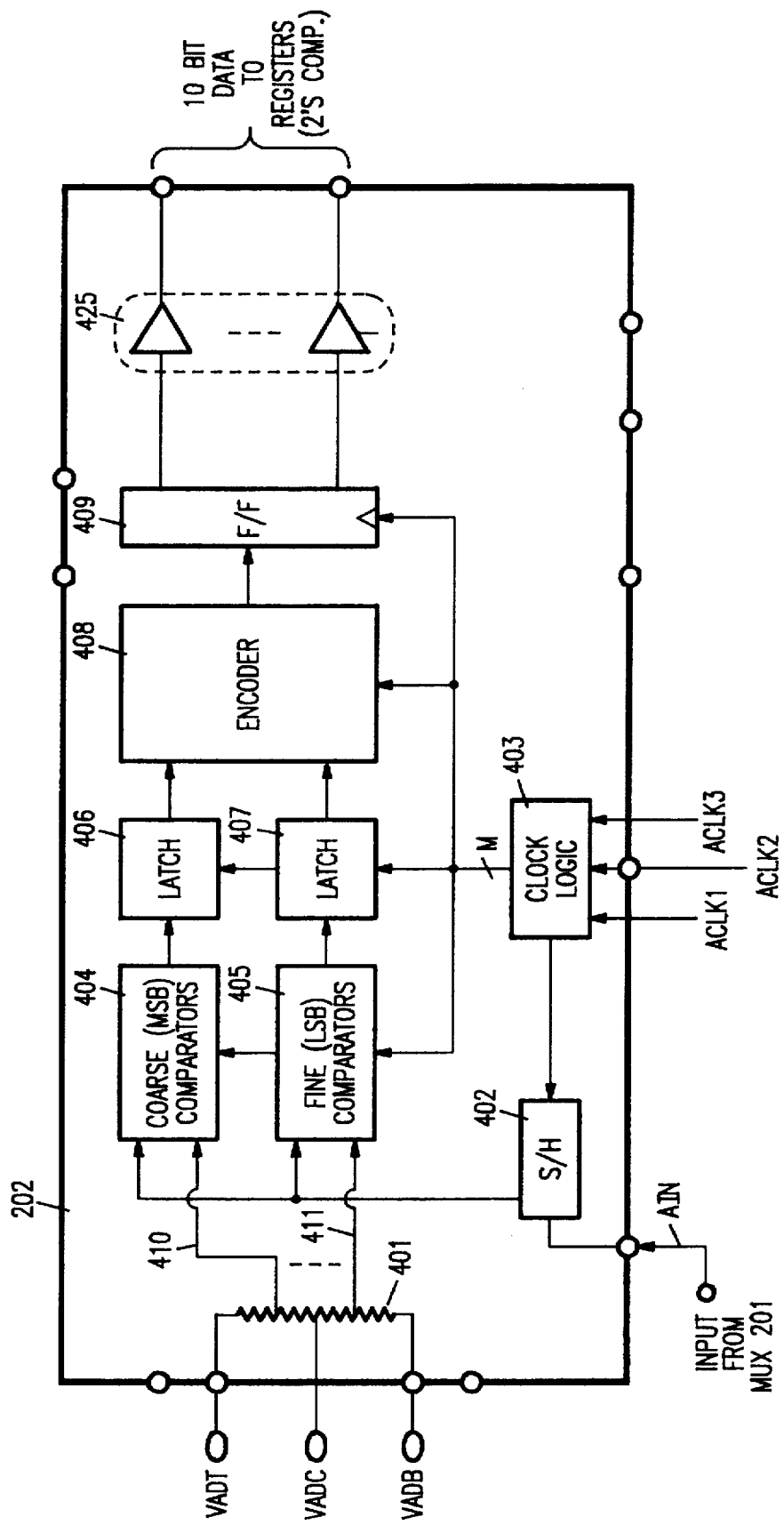
FIG. 4A is a more detailed diagram of one embodiment of a two step flash A/D converter 202.

FIG. 4A is a more detailed block diagram of one embodiment of A/D converter 202 that is a two-step flash A/D converter. Voltage VADT is applied to one end of reference ladder 401 and voltage VADB is applied to the other end of reference ladder 401. Voltage VADC is applied to the middle of the voltage reference ladder 401. Line 410 represents a plurality of lines that carry voltages on the various taps of voltage reference ladder 401 between voltage VADT and VADC to coarse comparators 404 while line 411 represents a plurality of lines that carry voltages on the various taps of voltage reference ladder 401 between voltage VADC and VADB to fine comparators 405.

Each of the comparators in coarse comparators 404 and fine comparators 405 receive the output signal from sample and hold circuit 402 as an input signal. The input terminal of sample and hold circuit 402 receives output signal AIN from analog multiplexer 201.

The output signal from coarse comparators 404 is captured in a first latch circuit 406 and is applied to encoder circuit 408. The output signal from fine comparators 405 is captured in a second latch circuit 407 and is also applied to encoder circuit 408. The output signals from latch banks 406 and 407 are summed in a digital adder in encoder circuit 408.

Encoder circuit 408 converts the sum of the input signals from first and second latch circuits 406 and 407 to a twos complement digital number and the result is captured in flip-flop circuit 409 that in turn drives a digital bus interface 425. Digital bus interface 425 drives 10-bits of digital data bus 207. All of the elements in A/D converter 202 are clocked by signals from clock logic circuit 403 which receives as input signals, sample enable signal ACLK1, coarse compare enable signal ACLK2, and fine compare enable signal ACLK3.

Figure 4B:
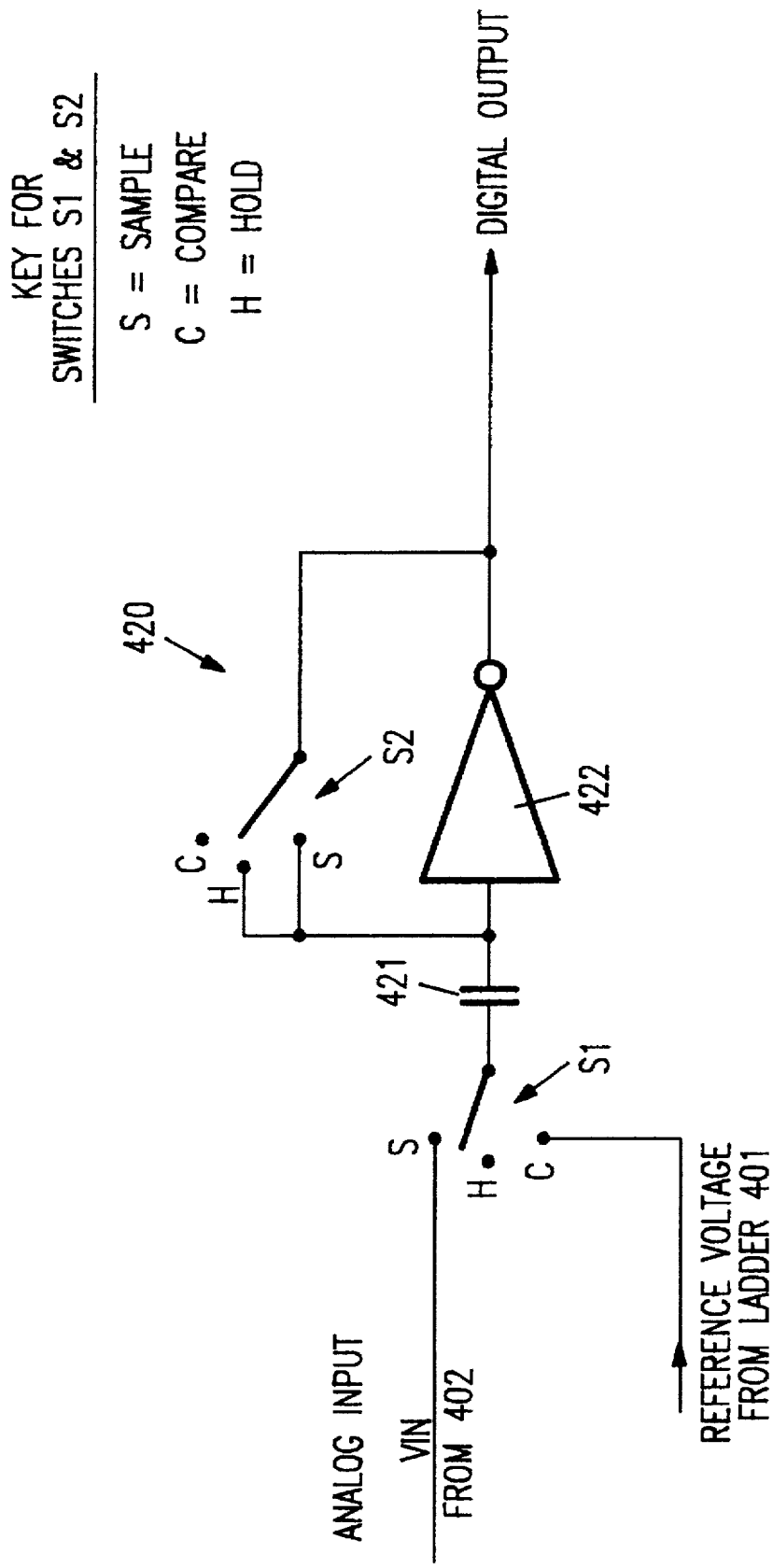
FIG. 4B is a diagram of a charge balance comparator circuit that is utilized in the coarse and fine comparator circuits of FIG. 4A.

FIG. 4B is an example of a charge balance comparator circuit 420 used in both coarse and fine comparator circuits 404 and 405. When comparator 420 is in the sample mode, i.e., when sample enable signal ACLK1 is active, switch S1 connects the input signal on pole S of switch S1 from sample and hold circuit 402 to capacitor 421. Capacitor 421 is connected to the input terminal of inverting amplifier 422 and to poles S and H of switch S2. In the sample mode, switch S2 connects the output terminal of amplifier 422 to the input terminal of amplifier 422.

When charge balance comparator circuit 420 is in the hold mode, i.e. when sample enable signal ACLK1 is inactive, switch S1 is open and switch S2 still connects the input and output terminals of amplifier 422. When charge balance comparator circuit 420 in coarse comparators 404 is in the compare mode, i.e., when coarse compare enable signal ACLK2 is active, switch S1 connects the reference voltage from reference voltage ladder 401 to capacitor 421 and switch S2 disconnects the input and output terminals of amplifier 422. The output signal of amplifier 422 goes either high or low depending on the relative amplitude of the voltage on capacitor 421 and the voltage from reference ladder 401. When coarse compare enable signal ACLK2 goes inactive, the output signal of comparator circuit 420 is captured in latch 406, and a portion of reference ladder 401 is selected for use in the comparison by fine comparators 405.

When charge balance comparator circuit 420 in fine comparators 405 is in the compare mode, i.e, when fine compare enable signal ACLK3 is active, switch S1 connects the reference voltage from reference voltage ladder 401 to capacitor 421 and switch S2 disconnects the input and output terminals of amplifier 422. The output signal of amplifier 422 goes either high or low depending on the relative amplitude of the voltage on capacitor 421 and the voltage from reference ladder 401. When fine compare enable signal ACLK3 goes inactive, the output signal of comparator circuit 420 is captured in latch 407. One embodiment of a 2-step flash A/D converter suitable for use in this invention is available from Micro Power Systems, 3100 Alfred Street, Santa Clara, Calif. 95054 as part number MP8784.

Figure 5:
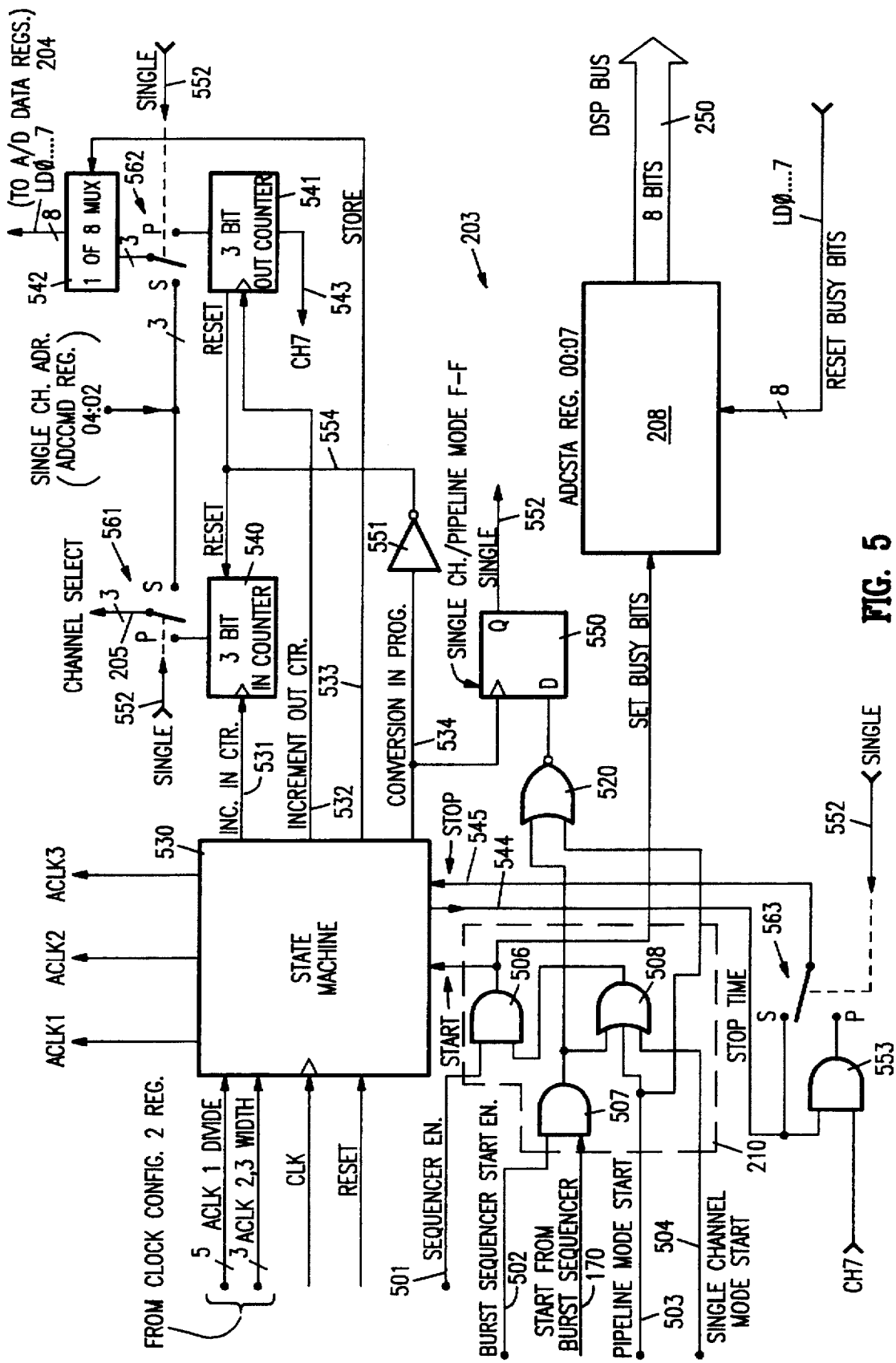
FIG. 5 is a more detailed diagram of the start sequence select circuit, the acquisition sequencer, and the acquisition status register of FIG. 2.

FIG. 5 is a more detailed diagram of acquisition sequencer 203 and start sequencer select circuit 210. In this embodiment, in addition to signal STRT1 on line 170 from the burst sequencer in programmable servo burst decoder 130, start sequencer select circuit 210 receives an acquisition sequencer enable signal on input line 501, a burst sequencer start pulse enable signal on input line 502, a pipeline mode start signal on input line 503, and a single channel mode start signal on input line 504.

The state of the signal on acquisition sequencer enable signal on input line 501 is determined by the acquisition sequencer enable bit, bit 5, in acquisition command register 209. The state of burst sequencer start pulse enable signal on input line 502 is determined by the burst sequencer start pulse enable bit, bit 8, in acquisition command register 209. The state of pipeline mode start signal on input line 503 is determined by the pipeline mode start bit, bit 1, in acquisition command register 209. The state of single channel mode start signal on input line 504 is determined by the single channel mode start bit, bit 0, in acquisition command register 209.

The signal on line 502 drives a first input terminal of AND gate 507 and a second input terminal of AND gate 507 is driven by the signal on line 170. Thus, when burst sequencer start pulse enable bit is set and the signal on line 170 from the burst sequencer in programmable servo burst decoder 130 goes active, the output signal of AND gate 507 goes active, and otherwise the output signal of AND gate 507 is inactive.

The output signal of AND gate 507 drives a first input terminal of OR gate 520 in acquisition sequencer 203 and a first input terminal of OR gate 508 in start sequencer select circuit 210. The pipeline mode start signal on line 503 drives a second input terminal of OR gate 508 and a second input terminal of NOR gate 520. The single channel mode start signal on line 504 drives a third input terminal of OR gate 508. Thus, if any one of the output signal of AND gate 507, the pipeline mode start bit, or the single channel mode start bit is active, the output signal of OR gate 508 is active, and otherwise, the output signal of OR gate 508 is inactive.

The output signal of OR gate 508 is applied to a first input terminal of AND gate 506. A second input terminal of AND gate 506 is driven by an acquisition sequencer enable bit, bit 5, in acquisition command register 209. When the acquisition sequencer enable bit is set and the output signal of OR gate 508 is active, AND gate 506 generates an active signal on line START to state machine 530 in acquisition sequencer 203. Thus, start sequencer select circuit 210 generates an active signal on line START to acquisition sequencer 203 when (a) any one of the following conditions is true: (i) the pipeline mode start bit is set; (ii) the single channel mode start bit is set; and (iii) the burst sequencer start pulse enable bit is set and an active start signal is received from programmable servo burst decoder 130 on line 170, and (b) the acquisition sequencer enable bit is set.

Acquisition sequencer 203 is built around state machine 530. In this embodiment, state machine 530 receives input signals from the clock configuration register CLCFG2, input signal START from start sequencer select circuit 210, input signal STOP that is generated by acquisition sequencer 203, clock input signal CLK and a reset input signal, and generates signals on lines ACKL1, ACLK2 and ACLK3 as well as signals on increment in counter line 531, increment out counter line 532, store line 533, and conversion in progress line 534. The output signals, as explained more completely below, from state machine 530 are updated at each rising edge of clock signal CLK based on the state of the input and output signals just before the rising edge of clock signal CLK.

Acquisition sequencer 203 operates in one of two modes, pipeline and single channel. If either the pipeline mode start signal on line 503 is active, or the output signal of AND gate 507 is active, the output signal of NOR gate 520 to input terminal D of single channel/pipeline mode flip-flop 550 is inactive. Thus, when state machine 530 drives the signal on conversion in progress line 534 active, the inactive signal is clocked through flip-flop 550 to output terminal Q which drives single channel line 552. Logic switches 561, 562 and 563 are all configured so that the selector is connected to pole P of the respective switch when acquisition sequencer 203 is in the pipeline mode of operation.

The active signal on conversion in progress line 534 drives the output signal of invertor 551 on reset line 554 inactive and so three bit counters 540 and 541 are taken out of reset. Thus, each positive edge on increment in counter line 531 from state machine 530 to counter 540 increments counter 540. The output value of counter 540 drives channel select lines 205 to analog multiplexer 201. Consequently, as counter 540 is sequentially incremented from 0 to 7 by state machine 530, analog multiplexer 201 sequentially passes therethrough the signals on channels 0 to 7 to A/D converter 202.

Similarly, each positive edge on increment out counter line 532 from state machine 530 to counter 541 increments counter 541. The output value of counter 541 drives the three select lines to eight to one demultiplexer 542. Consequently, as counter 541 is sequentially incremented from 0 to 7 by state machine 530, demultiplexer 542 sequentially passes therethrough the signal on store line 533 to the corresponding load line LD0 to LD7 to registers 204 and to the reset terminal to the corresponding busy bit in acquisition status register 208.

When the value of counter 541 reaches seven, the signal on channel seven line 543 to a first input terminal of AND gate 553 goes active. A second input terminal of AND gate 553 is driven by the signal on stop time line 544 from state machine 530 and so if the signal on stop time line 544 is active when the value of counter 541 reaches seven, AND gate 553 drives the signal on stop line 545 active. In response to the active signal on stop line 545, state machine 530 returns to an idle state and so terminates operation in the pipeline mode.

If both the pipeline mode start signal on line 503 and the output signal of AND gate 507 are inactive, the output signal of NOR gate 520 to input terminal D of single channel/ pipeline mode flip-flop 550 is active. Thus, if single channel mode start bit is set, OR gate 508 generates an active output signal to AND gate 506. If the acquisition sequencer enable bit is set, the active output signal from OR gate 508 causes AND gate 506 to generate an active signal on line START to state machine 530. When state machine 530 drives the signal on conversion in progress line 534 active, the active signal from NOR gate 520 is clocked through flip-flop 550 to output terminal Q which drives single channel line 552. Logic switches 561, 562 and 563 are all configured so that the selector is connected to pole S of the switch when the signal on single channel line 552 is active and acquisition sequencer 203 is in the single channel mode of operation.

In the signal channel mode of operation, three-bit counters 540 and 541 as well as AND gate 553 are taken out of the circuit. The value of the signal channel mode channel mode address bits are applied to channel select lines 205 of analog multiplexer 201 and to the select lines to one to eight demultiplexer 542.

In both the single channel and the pipeline mode of operations, the active signal on line START is also used to set the busy bits in acquisition status register 208. The load signal to registers 204 is used to reset the corresponding busy bit in acquisition status register 208.

Figure 6A:
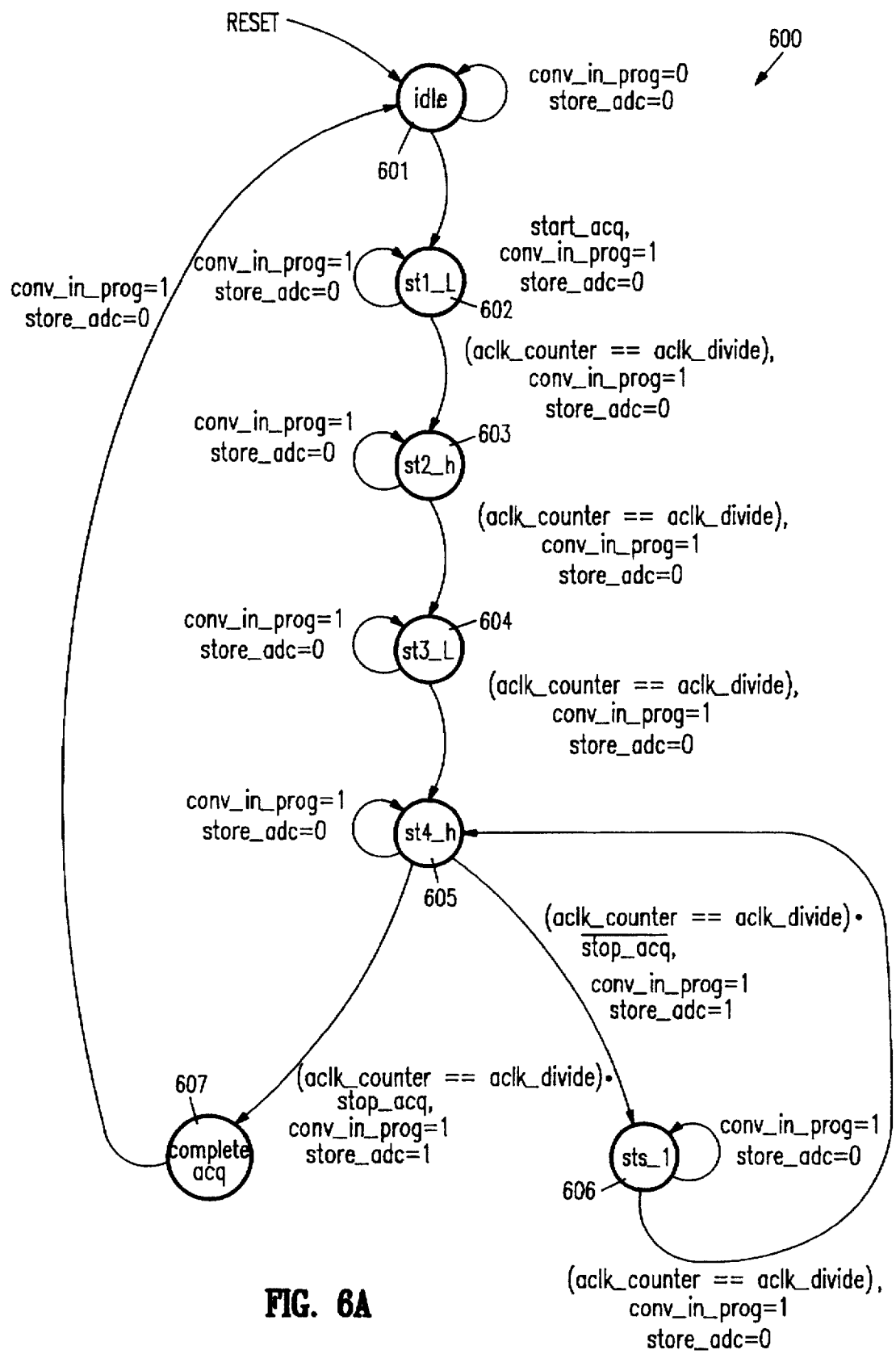
FIGS. 6A and 6D are state diagrams for the state machine of FIG. 5.

FIG. 6A is a state diagram 600 for generation of sample enable signal ACLK1, a store pulse on store line 533 and the conversion in progress signal on line 534 by state machine 530. Upon reset of analog data acquisition system 100, state machine 530 enters idle state 601. In idle state 601, conversion in progress signal is inactive and the signal on store line 533 is inactive. Hence, counters 540 and 541 are held in reset.

State machine 530 remains in idle state 601 until the signal on line START from AND gate 506 goes active. In response to the active signal on line START, state machine 530 transitions from idle state 601 to (ST1_L) state 602 and the conversion in progress signal on line 534 is driven active and the signal on store line 533 remains inactive. Thus, upon the transition to (ST1_L) state 602, counters 540 and 541 are taken out of reset, flip-flop 550 is clocked, with the result described above, and also other circuitry is activated within state machine 530.

Figure 6B:
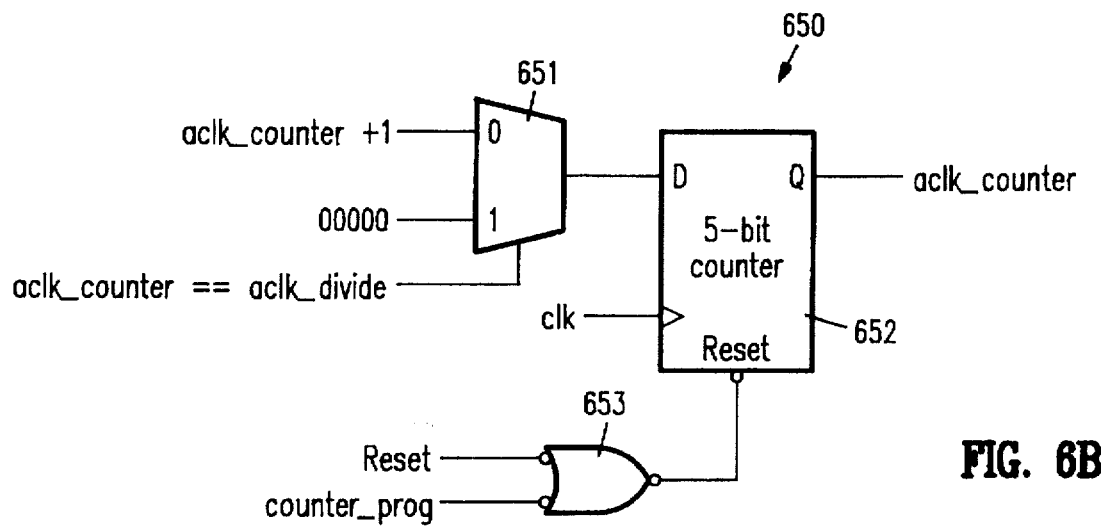
FIG. 6B is schematic diagram of a sample clock counter circuit within the state machine of FIG. 5.

FIG. 6B is a schematic of sample clock counter circuit 650 within state machine 530. In this embodiment, an output line of a two-to-one multiplexer 651 is connected to input terminal D of a five bit counter 652. The signal on a first input terminal of multiplexer 651 is the value of counter 652 plus one and the signal on a second input terminal of multiplexer 651 is a value of zero.

The signal passed through multiplexer 651 is determined by the value of counter 652. Specifically, when the value of counter 652 equals the value of the divisor ACLK1 bits in clock configuration register CLCFG2, the zero value is passed through multiplexer 651 and is loaded into counter 652 on the next positive clock edge on line CLK. Otherwise, the value of counter 652 plus one is passed through multiplexer 651 and is loaded into counter 652 on the next positive clock edge on line CLK. The output line of AND gate 653 is connected to the active low reset terminal of counter 652. A first input terminal of AND gate 653 is driven by an active low reset signal and a second input terminal of AND gate 653 is driven by the conversion in progress signal. Thus, in the transition from idle state 601 to (ST1_L) state 602, counter 652 is taken out of reset and incremented by each subsequent positive clock edge on line CLK.

Figure 6C:
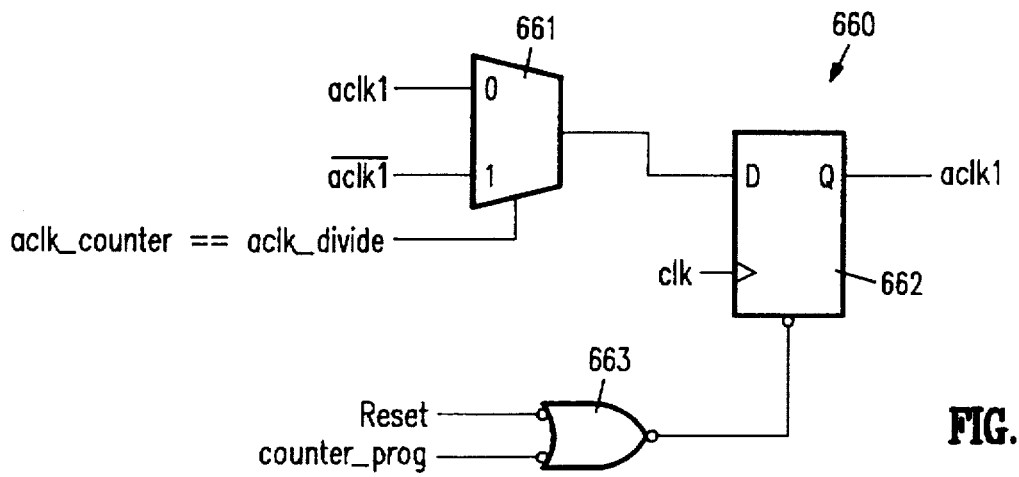
FIG. 6C is schematic diagram of a sample enable signal generation circuit within the state machine of FIG. 5.
Figure 7:
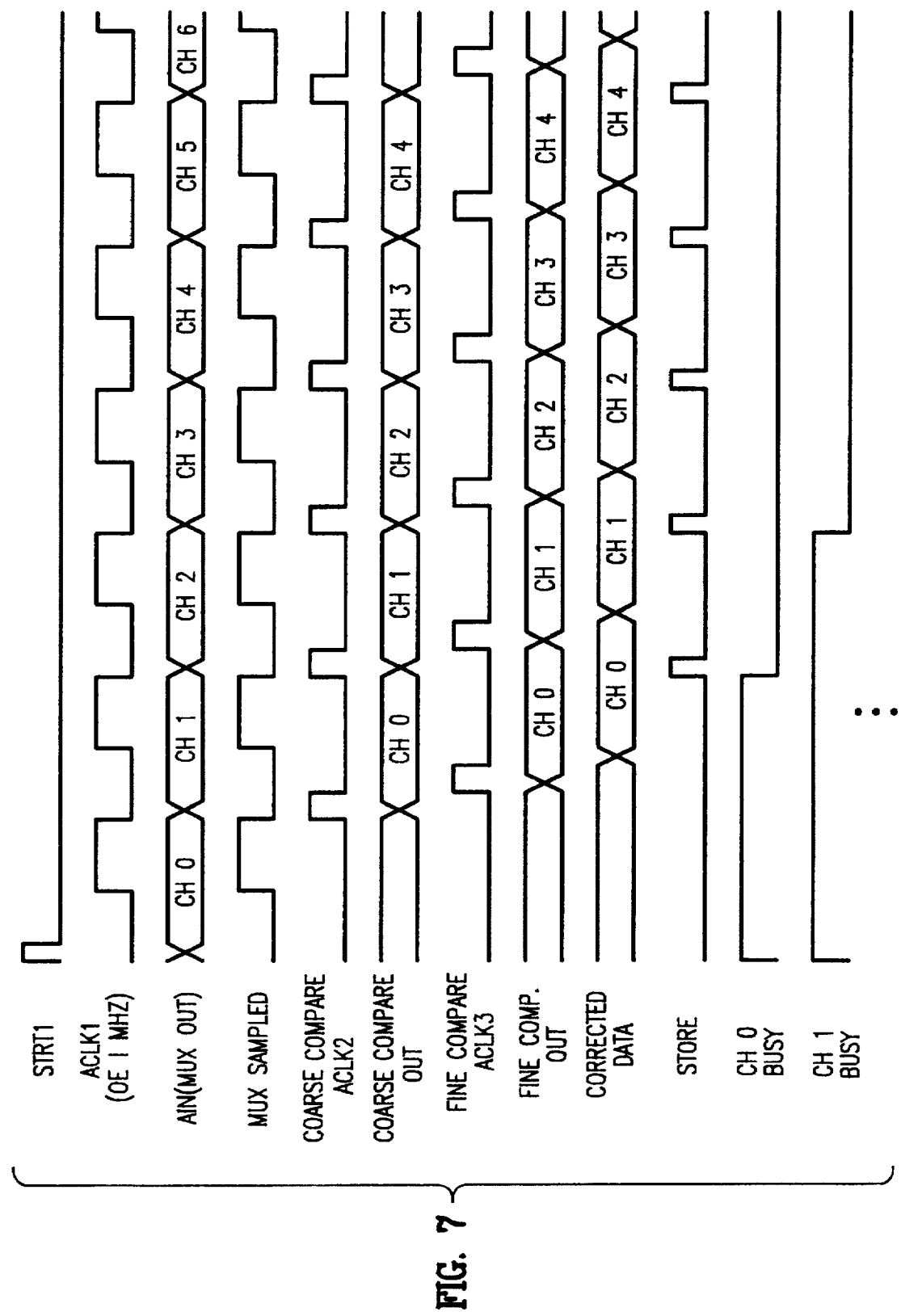
FIG. 7 is a timing diagram for the pipelined operation mode of the analog data acquisition sequencer of this invention.

FIG. 6C is a sample enable signal ACLK1 generation circuit 660. In this embodiment, the output line of a two to one multiplexer 661 is connected to input terminal D of a D-type flip-flop 662. Output terminal Q of flip-flop 662 drives sample enable line ACLK1 and is connected to a first input terminal of multiplexer 661. Output terminal /Q of flip-flop 662 is connected to a second input terminal of multiplexer 661 and so signal /ACLK1 on the second terminal is the complement of signal ACLK on the first terminal. The signal passed through multiplexer 661 is determined by the value of counter 652 (FIG. 6B). Specifically, when the value of counter 652 equals the value of the divisor ACLK1 bits in clock configuration register CLCFG2, the signal on the second terminal is passed through multiplexer 661 and is loaded into flip-flop 662 on the next positive clock edge on line CLK. Otherwise, the signal on the first input terminal is passed through multiplexer 661 and is loaded into flip-flop 662, sometimes called a storage element, on the next positive clock edge on line CLK. The output line of AND gate 663 is connected to the active low reset terminal of flip-flop 662. A first input terminal of AND gate 663 is driven by an active low reset signal and a second input terminal of AND gate 663 is driven by the conversion in progress signal. Thus, in the transition from idle state 601 to (ST1_L) state 602, flip-flop 662 is taken out of reset and the next positive clock edge on line CLK clocks a logic zero onto sample enable line ACLK1 (FIG. 7).

In (ST1_L) state 602, the conversion in progress signal on line 534 remains active and the signal on store line 533 remains inactive. The value of counter 652 is monitored in this state. State machine 530 remains in state 602 until the value of counter 652 equals the value of the divisor ACLK1 bits in clock configuration register CLCFG2. When the two values are equal, state machine 530 transitions from (ST1_L) state 602 to (ST2_H) state 603 and conversion in progress signal remains active and the signal on store line 533 remains inactive. The zero value is loaded in counter 652. The logic one on the second input terminal of multiplexer 661 is passed therethrough and loaded into flip-flop 662 onto the next positive clock edge on line CLK and so a logic one is driven onto sample enable line ACLK1 (FIG. 7). Thus, coarse comparators 404 and fine comparators 405 sample (as indicated by the MUX SAMPLED trace in FIG. 7) the signal from analog multiplexer 201, which is the MUXOUT signal in FIG. 7.

In (ST2_H) state 603, the conversion in progress signal on line 534 remains active and the signal on store line 533 goes inactive. The value of counter 652 also is monitored in this state. State machine 530 remains in state 603 until the value of counter 652 equals the value of the divisor ACLK1 bits in clock configuration register CLCFG2. When the two values are equal, state machine 530 transitions from (ST2_H) state 603 to (ST3_L) state 604 and conversion in progress signal remains active and the signal on store line 533 remains inactive. The zero value is loaded in counter 652. The logic zero on the second input terminal of multiplexer 661 is passed therethrough and loaded into flip-flop 662 on the next positive clock edge on line CLK and so a logic zero is driven onto sample enable line ACLK1 (FIG. 7) and consequently coarse comparators 404 and fine comparators 405 enter the hold state.

In (ST3_L) state 604, the conversion in progress signal on line 534 remains active and the signal on store line 533 remains inactive. The value of counter 652 is again monitored in this state. State machine 530 remains in state 604 until the value of counter 652 equals the value of the divisor ACLK1 bits in clock configuration register CLCFG2. When the two values are equal, state machine 530 transitions from (ST3_L) state 604 to (ST4_H) state 605 and conversion in progress signal remains active and the signal on store line 533 remain inactive. The zero value is loaded again in counter 652. The logic one on the second input terminal of multiplexer 661 is passed therethrough and loaded into flip-flop 662 on the next positive clock edge on line CLK and so a logic one is driven onto sample enable line ACLK1 (FIG. 7). Prior to an active signal ACLK1 going active for the second time, signals ACLK2, and ACLK3 are driven active in a second state sequence 610, that is described below.

In (ST4_H) state 605, the conversion in progress signal on line 534 remains active and the signal on store line 533 remain inactive. The value of counter 652 is monitored in this state. Also, the signal on stop time line 544 is driven active and so state machine 530 starts to sample for an active signal on stop line 545. State machine 530 remains in state 605 until the value of counter 652 equals the value of the divisor ACLK1 bits in clock configuration register CLCFG2. When the two values are equal, state machine 530 transitions from (ST4_H) state 605 to (ST5_L) state 606 if the signal on stop line 545 is inactive and to complete acquisition state 607 is signal on stop line 545 is active. In either transition, conversion in progress signal remains active and the signal on store line 533 is driven active and the corresponding channel busy bit is rest. (See lines STORE and CH0 BUSY, FIG. 7.) The zero value is loaded in counter 652. The logic zero on the second input terminal of multiplexer 661 is passed therethrough and loaded into flip-flop 662 on the next positive clock edge on line CLK and so a logic zero is driven onto sample enable line ACLK1 (FIG. 7).

In (ST5_L) state 606, the conversion in progress signal on line 534 remains active and the signal on store line 533 is driven inactive. The value of counter 652 is monitored in this state. State machine 530 remains in state 606 until the value of counter 652 equals the value of the divisor ACLK1 bits in clock configuration register CLCFG2. When the two values are equal, state machine 530 transitions from (ST5_L) state 606 to (ST4_H) state 605 and conversion in progress signal remains active and the signal on store line 533 remains inactive. The zero value is loaded in counter 652. The logic one on the second input terminal of multiplexer 661 is passed therethrough and loaded into flip-flop 662 on the next positive clock edge on line CLK and so a logic one is driven onto sample enable line ACLK1 (FIG. 7).

State machine 530 transitions between states 605 and 606 until the signal on stop line 545 goes active, and then state machine 530 transitions from state 605 to state 607. In the transition to state 607, conversion in progress signal remains active and the signal on store line 533 is driven active. (See line STORE, FIG. 7.) The zero value is loaded in counter 652. The logic zero on the second input terminal of multiplexer 661 is passed therethrough and loaded into flip-flop 662 on the next positive clock edge on line CLK and so a logic zero is driven onto sample enable line ACLK1 (FIG. 7).

State machine 530 simply transitions through completed acquisition state 607 to idle state 601. In the transition to state 601, conversion in progress signal remains active and the signal on store line 533 is driven inactive. (See line STORE, FIG. 7.)

Figure 6E:
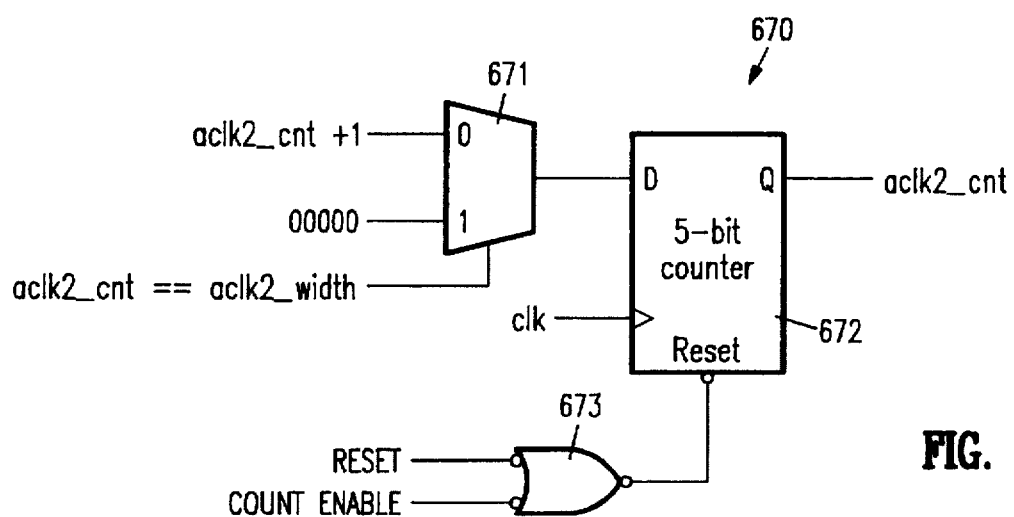
FIG. 6E is schematic diagram of a compare counter circuit within the state machine of FIG. 5.
Figure 6D:
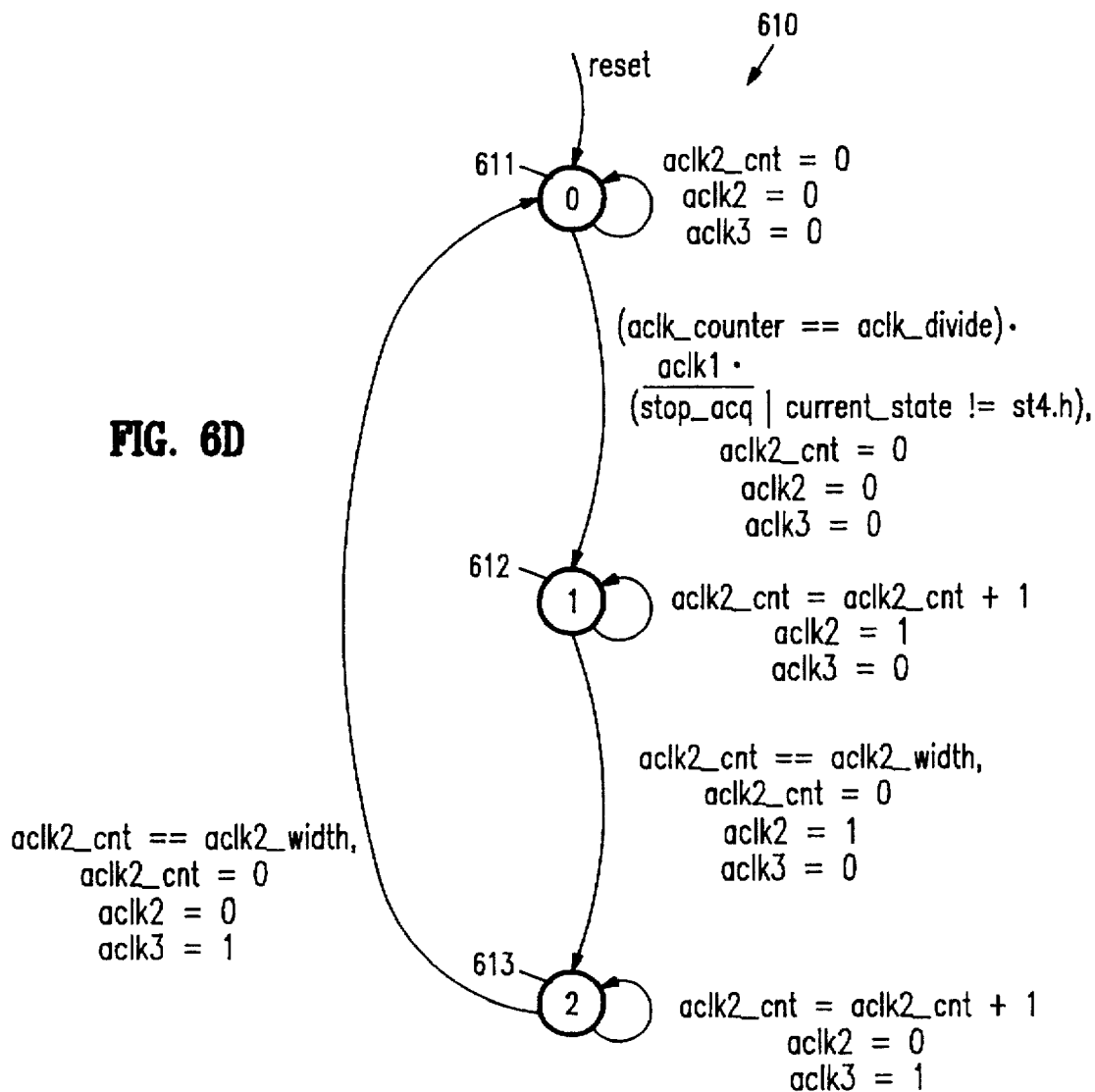

For clarity only state diagram 600 was considered above. However, simultaneously to the processing of state diagram 600, state machine 530 also processes state diagram 610 that is illustrated in FIG. 6D. Associated with the operation of state diagram 610 is a second counter in a compare counter circuit 670. FIG. 6E is a schematic of compare counter circuit 670 within state machine 530. In this embodiment, an output line of a two to one multiplexer 671 is connected to the input terminal of a five bit counter 672. The signal on a first input terminal of multiplexer 671 is the value of counter 672 plus one and the signal on a second input terminal of multiplexer 671 is a value of zero.

The signal passed through multiplexer 671 is determined by the value of counter 672. Specifically, when the value of counter 672 equals the value of the ACLK2 and ACLK3 pulse width bits in clock configuration register CLCFG2, the zero value is passed through multiplexer 671 and is loaded into counter 672 on the next positive clock edge on line CLK. Otherwise, the value of counter 672 plus one is passed through multiplexer 671 and is loaded into counter 672 on the next positive clock edge on line CLK. The output line of AND gate 673 is connected to the active low reset terminal of reset terminal of flip-flop 672. A first input terminal of AND gate 673 is driven by an active low reset signal and a second input terminal of AND gate 673 is driven by a count enable signal that is active high.

In state 611, counter 672 is held in reset by a low signal on the count enable line and so the counter output signal is zero and the signals on coarse compare enable line ACLK2 and fine compare enable line ACLK3 are both inactive. The value of counter 652 is monitored in this state. Also, state machine 530 starts to sample for an active signal on stop line 545 and whether sample enable signal ACLK1 is active. In state 611, the state within state diagram 600 also is monitored. State machine 530 remains in state 611 until (i) the value of counter 652 equals the value of the divisor ACLK1 bits in clock configuration register CLCFG2; and (ii) sample enable signal ACLK1 is active; and (iii) the signal on stop line 545 is not active or the current state in state diagram 600 is not (ST4_H) state 605.

When each of the above three conditions are true, state machine 530 transitions from state 611 to state 612. In the transition, counter 672 is taken out of reset by an active signal on the count enable line and the signals on coarse compare enable line ACLK2 and fine compare enable line ACLK3 are both inactive.

Figure 6F:
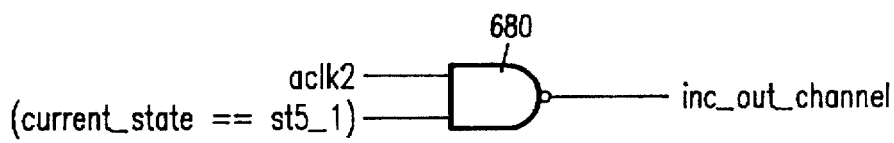
FIG. 6F is an increment out counter signal generation circuit within the state machine of FIG. 5.

In state 612, counter 672 is incremented by each rising edge on line CLK, the signal on coarse compare enable line ACLK2 is driven active (FIG. 7), and the signal on fine compare enable line ACLK3 remains inactive. The active signal on coarse compare enable line ACLK2 is a first input signal to NAND gate 680 (FIG. 6F). A second input signal to NAND gate 680 is driven active when the current state in state diagram 600 is (ST5_L) state 606. The output signal of NAND gate 680 is the increment out counter signal on line 532 to counter 541.

Figure 6G:
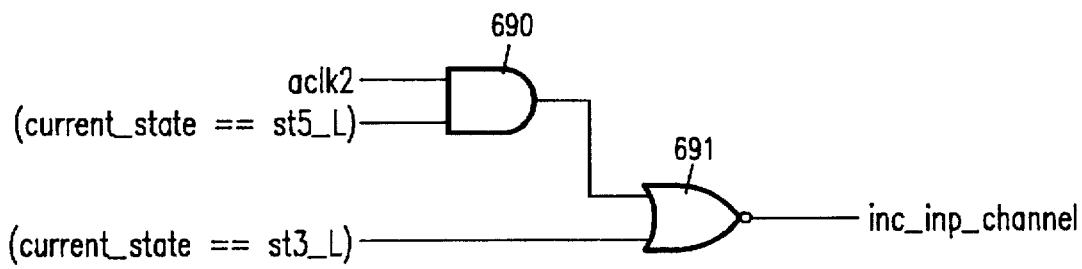
FIG. 6G is an increment in counter signal generation circuit within the state machine of FIG. 5.

The active signal on coarse compare enable line ACLK2 is also a first input signal to AND gate 690 (FIG. 6G). A second input signal to AND gate 690 is driven active when the current state in state diagram 600 is (ST5_L) state 606. The output signal of AND gate is a first input signal to NOR gate 691. A second input signal to NOR gate 691 is driven active when the current state in state diagram 600 is (ST3_L) state 604. The output signal of NOR gate 691 is the increment in counter signal on line 531 to counter 540.

State machine 530 remains in state 611 until the value of counter 672 equals the value of the ACLK2 and ACLK3 pulse width bits in clock configuration register CLCFG2. When the values are equal, state machine 530 transitions from state 612 to state 613. In the transition, counter 672 is reset to zero. The signal on coarse compare enable line ACLK2 is held active, and the signal on fine compare enable line ACLK3 remains inactive.

In state 613, counter 672 is incremented by each rising edge on line CLK, the signal on coarse compare enable line ACLK2 is driven inactive, and the signal on fine compare enable line ACLK3 is driven active (FIG. 7). State machine 530 remains in state 613 until the value of counter 672 equals the value of the ACLK2 and ACLK3 pulse width bits in clock configuration register CLCFG2. When the values are equal, state machine 530 transitions from state 613 to state 611. In the transition, counter 672 is reset to zero. The signal on coarse compare enable line ACLK2 is held inactive, and the signal on fine compare enable line ACLK3 remains active.

Figure 8:
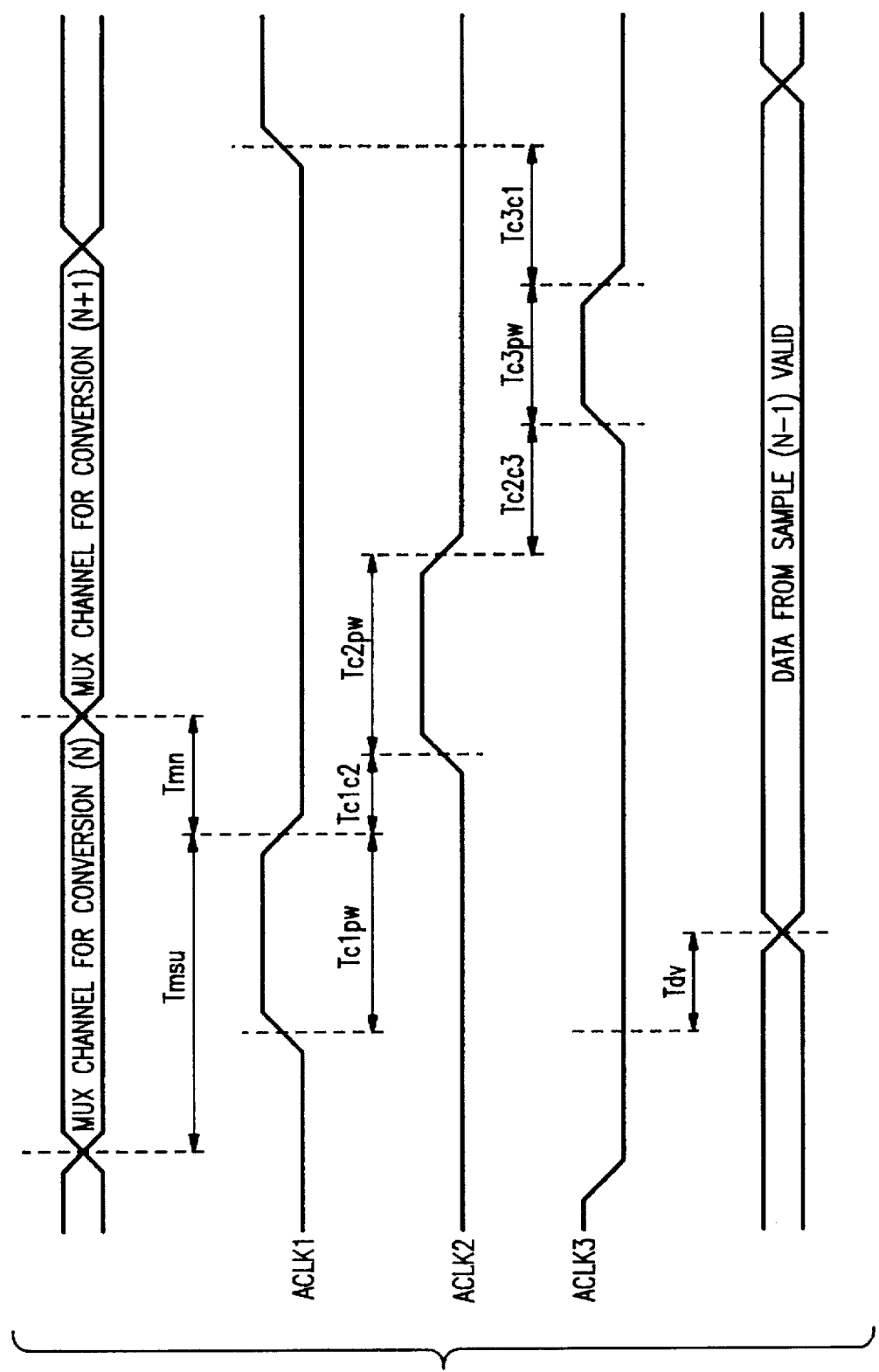
FIG. 8 is timing diagram showing the timing relationships for the A/D converter control signals.

Thus, the operation of state diagrams 600 and 610 within state machine generates signals ACLK1, ACLK2, and ACLK3. FIG. 8 is a timing diagram that indicates the timing relationships between the data signal on line AIN, signals ACLK1, ACLK2, ACLK3, and the data signal that shows when the digital data is available from the last sample. Table 4 defines each of the reference numerals in FIG. 8 and gives representation minimum values for 5 volt operation of analog data acquisition system 100.

TABLE 4

| Ref. No. | Description | Min. Time (ns) |
| --- | --- | --- |
| Tc1pw | Signal ACLK1 high pulse width | 500 |
| Tc1c2 | Signal ACLK1 falling to signal ACLK2 rising | 0 |
| Tc2pw | Signal ACLK2 high pulse width | 175 |
| Tc2c3 | Signal ACLK2 falling to signal ACLK3 rising | 0 |
| Tc3pw | Signal ACLK3 high pulse width | 200 |
| Tc3cl | Signal ACLK3 falling to signal ACLK1 rising | 50 |
| Tdv | Signal ACLK1 rising edge to valid data | 25 |
| Tmsu | Multiplexer 201 set-up time | 500 |
| Tmh | Multiplexer 201 hold time | 50 |

The embodiment of the analog data acquisition system described above is only illustrative of the principles of this invention and are not intended to limit the invention to the particular embodiment disclosed. In view of this disclosure, those skilled in the art can implement the analog data acquisition system in a wide variety of integrated circuits and in a wide variety of configurations to achieve the advantages described above.

I claim:

1. An analog data acquisition system comprising:

an analog input multiplexer having a plurality of input lines, an output line and a plurality of signal select lines;

an analog-to-digital (A/D) converter having an input line, a digital output bus, and a plurality of control lines; wherein said input line of said A/D converter is connected to said analog input multiplexer output line; and an acquisition sequencer coupled to said plurality of signal select lines and to said plurality of control lines; wherein said acquisition sequencer comprises:

a state machine connected to said plurality of control lines of said A/D converter wherein said state machine generates said signals over said plurality of control lines so that each signal on said A/D converter input line is converted to a digital signal; and further wherein said acquisition sequencer provides signals over said plurality of signal select lines so that a signal on one of said plurality of input lines to said analog input multiplexer is applied to said A/D converter; and said acquisition sequencer provides signals over said plurality of control lines so that each signal on said A/D converter input line is converted to a digital signal.

2. The analog data acquisition system of claim 1 further comprising a memory connected to said digital output bus of said A/D converter wherein a portion of said memory is within a memory space of a processor so that data in said memory can be read directly by said processor without a data move.

3. The analog data acquisition system of claim 2 wherein said memory comprises a plurality of registers.

4. The analog data acquisition system of claim 3 wherein said acquisition sequencer further comprises:

a counter circuit coupled to said plurality of registers; wherein said counter circuit generates a signal to select one of said plurality of registers into which said digital data on said digital bus of said A/D converter are loaded.

5. The analog data acquisition system of claim 3 further comprising a register having a plurality of bits connected to said acquisition sequencer wherein said plurality of bits select one of said plurality of registers into which said digital data on said digital bus of said A/D converter are loaded.

6. The analog data acquisition system of claim 1 wherein said acquisition sequencer further comprises:

a counter circuit coupled to said plurality of signal select lines of said analog input multiplexer and coupled to a conversion in progress signal line of said state machine; wherein, in response to an active signal on said conversion in progress signal line, said counter circuit generates signals on said plurality of signal select lines so that a selected one of signals on said analog input multiplexer input lines are passed through said analog input multiplexer to said analog input multiplexer output line.

7. The analog data acquisition system of claim 6 wherein said state machine further comprises an increment in counter line connected to said counter circuit wherein said state machine generates an active signal on said increment in counter line to change the value of said counter circuit.

8. The analog data acquisition system of claim 1 further comprising a register having a plurality of bits connected to said acquisition sequencer wherein said plurality of bits generates signals on said plurality of signal select lines so that a selected one of signals on said analog input multiplexer input lines are passed through said analog input multiplexer to said analog input multiplexer output line.

9. The analog data acquisition system of claim 1 wherein said acquisition sequencer further comprises:
   a counter circuit coupled to said plurality of signal select lines of said analog input multiplexer;
      wherein said counter circuit generates signals on said plurality of signal select lines so that a selected one of signals on said analog input multiplexer input lines are passed through said analog input multiplexer to said analog input multiplexer output line.

10. The analog data acquisition system of claim 1 further comprising a multiplicity of configurable buffers wherein each configurable buffer has an output terminal that is selectively connectable to and disconnectable from one of said plurality of input lines of said analog multiplexer
   wherein upon connecting said configurable buffer to said one of plurality of input lines of said analog multiplexer, said analog multiplexer receives a buffered input signal; and
   upon disconnecting said configurable buffer from said one of plurality of input lines of said analog multiplexer, said analog multiplexer receives an unbuffered input signal.

11. The analog data acquisition system of claim 1 wherein a first set of said plurality of input lines of said analog input multiplexer are servo position burst input lines.

12. The analog data acquisition system of claim 11 further comprising an operational amplifier having an output terminal connected to one of said plurality of input lines of said analog input multiplexer.

13. The analog data acquisition system of claim 1 further comprising an operational amplifier having an output terminal connected to one of said plurality of input lines of said analog input multiplexer.

14. The analog data acquisition system of claim 1 further comprising a channel input signal select multiplexer having an output line connected of one of said plurality of input lines of said analog input multiplexer and a plurality of input lines wherein in response to an input select signal, said channel input signal select multiplexer passes therethrough a signal on one of said plurality of channel input signal select multiplexer input lines to said output line.

15. The analog data acquisition system of claim 1 wherein said A/D converter further comprises a plurality of reference voltage input lines.

16. The analog data acquisition system of claim 15 further comprising;
   an A/D reference select and buffers circuit connected to said plurality of reference voltage input lines and having a plurality of input lines.

17. The analog data acquisition system of claim 16 wherein a first set of said plurality of input lines of said A/D reference select and buffers circuit are connected to input pins of an integrated circuit containing said analog data acquisition system.

18. The analog data acquisition system of claim 1 further comprising an acquisition command register coupled to said acquisition sequencer and having a plurality of bits wherein for one configuration of said plurality of bits said acquisition sequencer operates in a pipelined mode.

19. The analog data acquisition system of claim 1 further comprising an acquisition status register coupled to said acquisition sequencer.

20. In an integrated circuit having a plurality of pins, an analog data acquisition system comprising:
   a first plurality of inputs lines;
   an analog input multiplexer connected to said first plurality of input lines and having a plurality of channel select lines and an output line;
   an A/D reference select and buffers circuit having:
      a first plurality of input lines connected to a plurality of said pins;
      a second plurality of input lines connected to a reference voltage source within said integrated circuit; and
      a plurality of reference voltage output lines;
   an analog-to-digital (A/D) converter having:
      an input terminal connected to said output line of said analog input multiplexer;
      a plurality of reference voltage input terminals connected to said plurality of reference voltage output lines;
      a plurality of control input lines; and
      a digital output bus interface;
   an acquisition sequencer circuit connected to said plurality of channel select lines, to said plurality of control lines and having a plurality of output load lines; and
   a memory coupled to said digital output bus interface of said A/D converter and to said plurality of output load lines wherein in a first mode of operation said analog data acquisition system operates in a pipeline mode and in a second mode of operation said analog data acquisition system operates in a single channel mode.

21. An analog data acquisition system comprising:
   an analog input multiplexer having a plurality of input lines, an output line and a plurality of signal select lines wherein a first set of said plurality of input lines of said analog input multiplexer are servo position burst input lines;
   an analog-to-digital (A/D) converter having an input line, a digital output bus, and a plurality of control lines; wherein
      said input line of said A/D converter is connected to said analog input multiplexer output line; and
   an acquisition sequencer coupled to said plurality of signal select lines and to said plurality of control lines; wherein
      said acquisition sequencer provides signals over said plurality of signal select lines so that a signal on one of said plurality of input lines to said analog input multiplexer is applied to said A/D converter; and
      said acquisition sequencer provides signals over said plurality of control lines so that each signal on said A/D converter input line is converted to a digital signal.

22. The analog data acquisition system of claim 21 further comprising a memory connected to said digital output bus of said A/D converter wherein a portion of said memory is within a memory space of a processor so that data in said memory can be read directly by said processor without a data move.

23. The analog data acquisition system of claim 22 wherein said memory comprises a plurality of registers.

24. The analog data acquisition system of claim 23 wherein said acquisition sequencer further comprises:
   a counter circuit coupled to said plurality of registers; wherein
      said counter circuit generates a signal to select one of said plurality of registers into which said digital data on said digital bus of said A/D converter are loaded.

25. The analog data acquisition system of claim 23 further comprising a register having a plurality of bits connected to said acquisition sequencer wherein said plurality of bits select one of said plurality of registers into which said digital data on said digital bus of said A/D converter are loaded.

26. The analog data acquisition system of claim 21 wherein said acquisition sequencer further comprises:

a state machine connected to said plurality of control lines of said A/D converter wherein said state machine generates said signals over said plurality of control lines so that each signal on said A/D converter input line is converted to a digital signal.

27. The analog data acquisition system of claim 26 wherein said acquisition sequencer further comprises:

a counter circuit coupled to said plurality of signal select lines of said analog input multiplexer and coupled to a conversion in progress signal line of said state machine;
wherein, in response to an active signal on said conversion in progress signal line, said counter circuit generates signals on said plurality of signal select lines so that a selected one of signals on said analog input multiplexer input lines are passed through said analog input multiplexer to said analog input multiplexer output line.

28. The analog data acquisition system of claim 27 wherein said state machine further comprises an increment in counter line connected to said counter circuit wherein said state machine generates an active signal on said increment in counter line to change the value of said counter circuit.

29. The analog data acquisition system of claim 21 wherein said analog data acquisition further comprising a register having a plurality of bits connected to said acquisition sequencer wherein said plurality of bits generates signals on said plurality of signal select lines so that a selected one of signals on said analog input multiplexer input lines are passed through said analog input multiplexer to said analog input multiplexer output line.

30. The analog data acquisition system of claim 21 wherein said acquisition sequencer further comprises:

a counter circuit coupled to said plurality of signal select lines of said analog input multiplexer;
wherein said counter circuit generates signals on said plurality of signal select lines so that a selected one of signals on said analog input multiplexer input lines are passed through said analog input multiplexer to said analog input multiplexer output line.

31. The analog data acquisition system of claim 21 further comprising a multiplicity of configurable buffers wherein each configurable buffer has an output terminal that is selectively connectable to and disconnectable from one of said plurality of input lines of said analog multiplexer wherein upon connecting said configurable buffer to said one of plurality of input lines of said analog multiplexer, said analog multiplexer receives a buffered input signal; and upon disconnecting said configurable buffer from said one of plurality of input lines of said analog multiplexer, said analog multiplexer receives an unbuffered input signal.

32. The analog data acquisition system of claim 21 further comprising an operational amplifier having an output terminal connected to one of said plurality of input lines of said analog input multiplexer.

33. The analog data acquisition system of claim 21 further comprising an operational amplifier having an output terminal connected to one of said plurality of input lines of said analog input multiplexer.

34. The analog data acquisition system of claim 21 further comprising a channel input signal select multiplexer having an output line connected of one of said plurality of input lines of said analog input multiplexer and a plurality of input lines wherein in response to an input select signal, said channel input signal select multiplexer passes therethrough a signal on one of said plurality of channel input signal select multiplexer input lines to said output line.

35. The analog data acquisition system of claim 21 wherein said A/D converter further comprises a plurality of reference voltage input lines.

36. The analog data acquisition system of claim 35 further comprising;

an A/D reference select and buffers circuit connected to said plurality of reference voltage input lines and having a plurality of input lines.

37. The analog data acquisition system of claim 36 wherein a first set of said plurality of input lines of said A/D reference select and buffers circuit are connected to input pins of an integrated circuit containing said analog data acquisition system.

38. The analog data acquisition system of claim 21 further comprising an acquisition command register coupled to said acquisition sequencer and having a plurality of bits wherein for one configuration of said plurality of bits said acquisition sequencer operates in a pipelined mode.

39. The analog data acquisition system of claim 21 further comprising an acquisition status register coupled to said acquisition sequencer.

* * * * *